United States Patent
Li et al.

(10) Patent No.: US 10,055,231 B1
(45) Date of Patent: Aug. 21, 2018

(54) NETWORK-ACCESS PARTITIONING USING VIRTUAL MACHINES

(75) Inventors: Xin Li, Cupertino, CA (US); Gaurav Banga, Cupertino, CA (US); Ian Pratt, Cambridge (GB); Vikram Kapoor, Cupertino, CA (US)

(73) Assignee: Bromium, Inc., Cupertino, CA (US)

( * ) Notice: Subject to any disclaimer, the term of this patent is extended or adjusted under 35 U.S.C. 154(b) by 1157 days.

(21) Appl. No.: 13/527,161

(22) Filed: Jun. 19, 2012

Related U.S. Application Data

(63) Continuation of application No. 13/419,345, filed on Mar. 13, 2012, now Pat. No. 9,148,428.

(51) Int. Cl.
- *G06F 9/46* (2006.01)
- *G06F 9/38* (2018.01)
- *G06F 9/455* (2018.01)

(52) U.S. Cl.
CPC ............ *G06F 9/3891* (2013.01); *G06F 9/455* (2013.01)

(58) Field of Classification Search
CPC ........ G06F 9/3891; G06F 9/455; G06F 9/468; G06F 9/50–9/52
USPC ........................................................ 718/104
See application file for complete search history.

(56) References Cited

U.S. PATENT DOCUMENTS

| | | | |
|---|---|---|---|
| 5,778,173 A | 7/1998 | Apte | |
| 6,108,799 A | 8/2000 | Boulay et al. | |
| 6,260,068 B1 * | 7/2001 | Zalewski | G06F 9/5077 707/999.01 |
| 6,578,068 B1 * | 6/2003 | Bowman-Amuah | G06F 9/505 709/203 |
| 6,789,156 B1 | 9/2004 | Waldspurger | |
| 6,948,044 B1 | 9/2005 | Chandrasekaran | |
| 7,171,523 B2 | 1/2007 | Yamasaki | |
| 7,406,522 B2 * | 7/2008 | Riddle | H04L 12/5695 709/223 |

(Continued)

FOREIGN PATENT DOCUMENTS

WO 2008073618 A2 6/2008

OTHER PUBLICATIONS

Rasmussen, "Why DNS Firewalls should become the next hot thing in enterprise security", www.securityweek.com/why-dns-firewalls-should-become-next-hot-thing-enterprise-security, Oct. 2011.*

(Continued)

*Primary Examiner* — Francisco Aponte
(74) *Attorney, Agent, or Firm* — Brokaw Patent Law PC; Christopher J. Brokaw

(57) ABSTRACT

Approaches for handling network resources in a virtualized computing environment. A first request for network resources is received from a first virtual machine. Policy data is consulted to determine how to service the first request. The first request is processed by providing the first virtual machine with access to only a first portion of network resources. A second request for network resources is received from a second virtual machine. Policy data is consulted to determine how to service the second request. The second request is processed by providing the second virtual machine with access to only a second portion of network resources that is not coextensive with the first portion. In this way, virtual machines may have access to particular resources and/or specific bounded areas of a network.

33 Claims, 11 Drawing Sheets

(56) References Cited

U.S. PATENT DOCUMENTS

| | | | |
|---|---|---|---|
| 7,480,911 B2* | 1/2009 | Lee | G06F 9/5077 718/104 |
| 7,694,328 B2 | 4/2010 | Joshi et al. | |
| 7,971,047 B1 | 6/2011 | Vlaovic et al. | |
| 7,996,834 B2 | 8/2011 | Araujo, Jr. et al. | |
| 8,060,703 B1 | 11/2011 | Desai et al. | |
| 8,146,084 B1 | 3/2012 | Meketa | |
| 8,151,263 B1 | 4/2012 | Venkitachalam et al. | |
| 8,171,141 B1 | 5/2012 | Offer et al. | |
| 8,209,514 B2* | 6/2012 | Kisel | G06F 3/0613 707/E17.01 |
| 8,219,987 B1 | 7/2012 | Vlaovic et al. | |
| 8,230,434 B2* | 7/2012 | Armstrong | G06F 9/5077 713/1 |
| 8,296,424 B2* | 10/2012 | Malloy | H04L 41/145 709/223 |
| 8,301,746 B2* | 10/2012 | Head | G06F 9/5077 709/203 |
| 8,346,727 B1 | 1/2013 | Chester et al. | |
| 8,347,263 B1 | 1/2013 | Offer | |
| 8,387,045 B2 | 2/2013 | Yasutaka et al. | |
| 8,391,494 B1 | 3/2013 | Serenyi | |
| 8,392,993 B1 | 3/2013 | Oliver | |
| 8,407,438 B1 | 3/2013 | Ranade | |
| 8,423,646 B2* | 4/2013 | Jamjoom | G06F 9/5077 709/203 |
| 8,429,276 B1 | 4/2013 | Kumar | G06F 9/45533 709/226 |
| 8,433,771 B1* | 4/2013 | Ellsworth | H04L 67/125 709/213 |
| 8,443,188 B2 | 5/2013 | Borde et al. | |
| 8,462,820 B2* | 6/2013 | Varier | H04L 41/0896 370/241.1 |
| 8,543,641 B2 | 9/2013 | Cherukuri et al. | |
| 8,601,583 B1 | 12/2013 | Chandrasekhar et al. | |
| 8,606,905 B1* | 12/2013 | Martin | G06F 8/60 709/224 |
| 8,639,814 B2 | 1/2014 | Jung et al. | |
| 8,640,137 B1* | 1/2014 | Bostic | G06F 9/5072 718/101 |
| 8,656,386 B1 | 2/2014 | Baimetov et al. | |
| 8,726,337 B1 | 5/2014 | Curry et al. | |
| 8,752,047 B2 | 6/2014 | Banga et al. | |
| 8,776,240 B1 | 7/2014 | Wu et al. | |
| 8,825,858 B1* | 9/2014 | Atchity | H04L 47/788 709/224 |
| 8,874,457 B2* | 10/2014 | Biran | G06Q 10/0637 705/7.12 |
| 8,875,129 B2* | 10/2014 | Wagner | G06F 9/542 709/223 |
| 8,904,400 B2* | 12/2014 | Kisel | G06F 9/5011 718/104 |
| 8,954,487 B2 | 2/2015 | Jung et al. | |
| 9,075,601 B1 | 7/2015 | Hucik et al. | |
| 9,275,230 B2* | 3/2016 | Ali | G06F 9/4401 |
| 9,384,031 B2* | 7/2016 | Shimogawa | G06F 9/45558 |
| 9,390,263 B2 | 7/2016 | Thomas | |
| 9,535,749 B2* | 1/2017 | Doddavula | G06F 9/50 |
| 2003/0070089 A1 | 4/2003 | Fu et al. | |
| 2003/0204569 A1 | 10/2003 | Andrews et al. | |
| 2004/0128670 A1 | 7/2004 | Robinson et al. | |
| 2005/0021994 A1 | 1/2005 | Barton et al. | |
| 2005/0149726 A1 | 7/2005 | Joshi et al. | |
| 2005/0188272 A1 | 8/2005 | Bodorin et al. | |
| 2005/0273866 A1 | 12/2005 | Brown et al. | |
| 2005/0278441 A1* | 12/2005 | Bond | G06F 9/5027 709/223 |
| 2006/0048157 A1* | 3/2006 | Dawson | G06F 9/5072 718/104 |
| 2006/0059492 A1* | 3/2006 | Fellenstein | G06Q 40/04 718/104 |
| 2006/0101189 A1 | 5/2006 | Chandrasekaran et al. | |
| 2006/0136910 A1 | 6/2006 | Brickell et al. | |
| 2006/0143617 A1* | 6/2006 | Knauerhase | G06F 9/50 718/104 |
| 2006/0184937 A1 | 8/2006 | Abels et al. | |
| 2006/0221832 A1* | 10/2006 | Muller | G06F 9/5077 370/235 |
| 2006/0288343 A1 | 12/2006 | Pallister | |
| 2007/0016907 A1* | 1/2007 | Benedetti | G06F 9/5038 718/104 |
| 2007/0028244 A1* | 2/2007 | Landis | G06F 9/5016 718/108 |
| 2007/0094396 A1 | 4/2007 | Takano et al. | |
| 2007/0157307 A1 | 7/2007 | Katoh et al. | |
| 2007/0171921 A1 | 7/2007 | Wookey et al. | |
| 2007/0180448 A1* | 8/2007 | Low | G06F 3/1415 718/1 |
| 2007/0180450 A1 | 8/2007 | Croft et al. | |
| 2007/0192329 A1 | 8/2007 | Croft et al. | |
| 2007/0198656 A1 | 8/2007 | Mazzaferri et al. | |
| 2007/0204341 A1* | 8/2007 | Rand | G06Q 10/107 726/22 |
| 2007/0300220 A1 | 12/2007 | Seliger et al. | |
| 2008/0001958 A1 | 1/2008 | Vembu et al. | |
| 2008/0059556 A1 | 3/2008 | Greenspan et al. | |
| 2008/0072276 A1 | 3/2008 | Pouliot | |
| 2008/0086779 A1 | 4/2008 | Blake et al. | |
| 2008/0104315 A1 | 5/2008 | Hall | |
| 2008/0148400 A1 | 6/2008 | Barron et al. | |
| 2008/0209138 A1 | 8/2008 | Sheldon et al. | |
| 2008/0216081 A1* | 9/2008 | Jackson | G06F 21/6218 718/104 |
| 2008/0229320 A1* | 9/2008 | Ueda | G06F 9/5038 718/104 |
| 2008/0244028 A1 | 10/2008 | Le et al. | |
| 2008/0244579 A1 | 10/2008 | Muller | |
| 2008/0271017 A1 | 10/2008 | Herington | |
| 2008/0320590 A1 | 12/2008 | Craft et al. | |
| 2009/0007242 A1 | 1/2009 | Subramanian et al. | |
| 2009/0119541 A1 | 5/2009 | Inoue et al. | |
| 2009/0125902 A1* | 5/2009 | Ghosh | G06F 9/45533 718/1 |
| 2009/0165133 A1 | 6/2009 | Hwang et al. | 726/22 |
| 2009/0172660 A1 | 7/2009 | Klotz, Jr. et al. | |
| 2009/0172820 A1 | 7/2009 | Watson | |
| 2009/0204964 A1 | 8/2009 | Foley et al. | |
| 2009/0217280 A1* | 8/2009 | Miller | G06F 9/52 718/104 |
| 2009/0222880 A1 | 9/2009 | Mayer et al. | |
| 2009/0249472 A1 | 10/2009 | Litvin et al. | |
| 2009/0260007 A1 | 10/2009 | Beaty et al. | |
| 2009/0271485 A1* | 10/2009 | Sawyer | G06F 3/061 709/206 |
| 2009/0276783 A1 | 11/2009 | Johnson et al. | |
| 2009/0300599 A1 | 12/2009 | Piotrowski | |
| 2009/0313620 A1 | 12/2009 | Sedukhin et al. | |
| 2009/0328033 A1 | 12/2009 | Kohavi et al. | |
| 2009/0328221 A1 | 12/2009 | Blumfield et al. | |
| 2010/0031325 A1 | 2/2010 | Maigne et al. | |
| 2010/0054260 A1* | 3/2010 | Pandey et al. | 370/395.53 |
| 2010/0058042 A1 | 3/2010 | Locker et al. | |
| 2010/0070725 A1 | 3/2010 | Prahlad et al. | |
| 2010/0122343 A1 | 5/2010 | Ghosh et al. | |
| 2010/0175063 A1* | 7/2010 | Ciano | G06F 9/4862 718/1 |
| 2010/0235831 A1 | 9/2010 | Dittmer | |
| 2010/0251388 A1 | 9/2010 | Dorfman | |
| 2010/0257523 A1 | 10/2010 | Frank | |
| 2010/0299667 A1 | 11/2010 | Ahmad et al. | |
| 2011/0022694 A1 | 1/2011 | Dalal et al. | |
| 2011/0035494 A1 | 2/2011 | Pandey et al. | |
| 2011/0099095 A1* | 4/2011 | Moore | G06Q 10/063 705/30 |
| 2011/0138055 A1* | 6/2011 | Daly | G06F 9/505 709/226 |
| 2011/0145926 A1 | 6/2011 | Dalcher et al. | |
| 2011/0173251 A1 | 7/2011 | Sandhu et al. | |
| 2011/0185064 A1* | 7/2011 | Head | G06F 9/5077 709/226 |
| 2011/0209140 A1 | 8/2011 | Scheidel et al. | |

(56) References Cited

U.S. PATENT DOCUMENTS

| | | | |
|---|---|---|---|
| 2011/0213997 A1* | 9/2011 | Kansal | G06F 1/3203 713/324 |
| 2011/0225582 A1 | 9/2011 | Likura et al. | |
| 2011/0258621 A1 | 10/2011 | Kern | |
| 2011/0296157 A1* | 12/2011 | Konetski et al. | 713/2 |
| 2011/0296412 A1 | 12/2011 | Banga et al. | |
| 2011/0296487 A1 | 12/2011 | Walsh | |
| 2011/0302577 A1 | 12/2011 | Reuther et al. | |
| 2012/0005672 A1 | 1/2012 | Cervantes et al. | |
| 2012/0054744 A1* | 3/2012 | Singh et al. | 718/1 |
| 2012/0089650 A1 | 4/2012 | Gibbs et al. | |
| 2012/0089666 A1* | 4/2012 | Goswami et al. | 709/203 |
| 2012/0102240 A1* | 4/2012 | Wei et al. | 710/30 |
| 2012/0110155 A1 | 5/2012 | Adlung et al. | |
| 2012/0110164 A1 | 5/2012 | Frey et al. | |
| 2012/0110588 A1 | 5/2012 | Bieswanger et al. | |
| 2012/0167204 A1 | 6/2012 | Akka | |
| 2012/0185848 A1* | 7/2012 | Devarakonda | G06F 9/5077 718/1 |
| 2012/0209923 A1 | 8/2012 | Mathur et al. | |
| 2012/0254860 A1 | 10/2012 | Bozek et al. | |
| 2012/0255014 A1 | 10/2012 | Sallam | |
| 2012/0260250 A1 | 10/2012 | Maeda et al. | |
| 2012/0297238 A1* | 11/2012 | Watson | G06F 9/5088 714/4.11 |
| 2012/0303322 A1* | 11/2012 | Rego | G06F 11/3495 702/182 |
| 2012/0311560 A1 | 12/2012 | Dobrovolskiy et al. | |
| 2013/0019277 A1* | 1/2013 | Chang et al. | 726/1 |
| 2013/0024644 A1 | 1/2013 | Givargis et al. | |
| 2013/0091570 A1 | 4/2013 | McCorkendale et al. | |
| 2013/0125116 A1* | 5/2013 | Liu | G06F 9/45558 718/1 |
| 2013/0159987 A1 | 6/2013 | Shi et al. | |
| 2013/0159998 A1* | 6/2013 | Cawlfield | G06F 9/45558 718/1 |
| 2013/0179894 A1 | 7/2013 | Calder et al. | |
| 2013/0212578 A1* | 8/2013 | Garg | H04L 43/0882 718/1 |
| 2013/0275975 A1* | 10/2013 | Masuda | G06F 9/5077 718/1 |
| 2013/0288647 A1 | 10/2013 | Turgeman | |
| 2013/0346987 A1 | 12/2013 | Raney et al. | |
| 2014/0068756 A1 | 3/2014 | Dorfman | |
| 2014/0137110 A1 | 5/2014 | Engle et al. | |
| 2014/0143825 A1 | 5/2014 | Behrendt et al. | |
| 2014/0201525 A1 | 7/2014 | Korthny et al. | |
| 2014/0258446 A1 | 9/2014 | Bursell | |
| 2014/0351810 A1 | 11/2014 | Pratt et al. | |
| 2016/0337382 A1 | 11/2016 | Thomas | |

OTHER PUBLICATIONS

Schmidt, Matthias, et al. "Trustbox: A Security Architecture for Preventing Data Breaches." Parallel, Distributed and Network-Based Processing (PDP), 2011, 5 pgs., 19th Euromicro International Conference on. IEEE, 2011.

Xia, Mingyuan, et al. "Enhanced Privilege Separation for Commodity Software on Virtualized Platform." Parallel and Distributed Systems (ICPADS), 2010 IEEE 16th International Conference on. IEEE, 2010.

Garfinkel, Tal, et al. "Terra: A Virtual Machine-Based Platform for Trusted Computing." ACM SIGOPS Operating Systems Review. vol. 37. No. 5. ACM, 2003.

R. Yavatkar et al., "A Framework for Policy-based Admission Control", Network Working Group, Jan. 2000, RFC 2753, pp. 1-20.

Zhang et al., "XenSocket: A High-Throughput Interdomain Transport for Virtual Machines", IBM T.J Watson research center, 2007, pp. 184-203.

* cited by examiner

NETWORK-ACCESS PARTITIONING USING VIRTUAL MACHINES

CLAIM OF PRIORITY

This application is a continuation-in-part of, and claims priority to, U.S. patent application Ser. No. 13/419,345, entitled "Seamless Management of Untrusted Data Using Virtual Machines," invented by Gaurav Banga et al., filed on Mar. 13, 2012 now U.S. Pat. No. 9,148,428, the contents of which are hereby incorporated by reference for all purposes as if fully set forth herein.

FIELD OF THE INVENTION

This application relates generally to networking and, more specifically, to approaches for the handling of network resources in a virtualized computing environment.

BACKGROUND

Ensuring the security of Internet users and Internet connected devices is one of the grand challenges facing us today. The current state of affairs is very problematic, as our cyber-security infrastructure is easily and routinely subverted by cyber criminals, resulting in great economic loss. Every year brings deeper and more complex dependence by society on our cyber-infrastructure, and yet at the same time the cyber-security problem only worsens as the capabilities of the cyber-criminal mature. In effect, we are building mission-critical dependence into virtually every aspect of human activities on a cyber-infrastructure that is very insecure at its core.

The current state of our cyber-security infrastructure is due, at least in part, to two fundamental limitations. The first limitation is a fundamental mismatch between the design assumptions made by computer security programmers with how the vast majority of users interact with the cyber-infrastructure (the "Security Model Complexity") problem. The second limitation is a lack of appropriate isolation of code and data from trusted and untrusted sources in modern computer systems (the "Lack of Isolation" problem). These two limitations of current systems are somewhat orthogonal, but are both very important for securing a computer system. The "Lack of Isolation" problem, in particular, is very important because modern computer devices, such as a PC or cell phone, are typically general purpose devices that execute a vast wide of software from different sources.

The general purpose capability of modern computing systems is constructed using a layered stack of hardware and software. An example of the layered arrangement of hardware and software that is present in modern computer systems is shown in FIG. 1. At the lowest layer, there is hardware with a small number of basic general purpose programming capabilities. Upon this hardware layer sits the firmware/BIOS which is responsible for, among other things, initializing hardware resources and loading the operating system. The operating system (OS) provides a file system and functionality which may be used by a variety of different applications. On top of the OS layer run the various applications which provide user-visible rich functionality to the computer. The functionality provided by the application layer is typically the primary concern of the computer user.

One advantage and consequence of the layered nature of modern computer systems is that the various layers may come from different vendors, as long as the layers conform to the specifications governing the layer boundary (which may be based on open or proprietary industry standards). To illustrate an example, in a typical PC today the hardware may be constructed around processor and chipset technology provided by Intel or AMD. The firmware/BIOS may be provided by companies like Insyde, AMI or Phoenix Technologies and may be written to conform to several industry specifications such as UEFI and PI. The operating system (OS) may originate from a company like Microsoft or Apple or may be a flavor of the Linux open source OS. Finally, the applications themselves are usually written to the specification of one of the operating systems and may be provided by one of a large multitude of application vendors.

Note that some of the applications may themselves have a layered architecture. A web browser, for example, typically includes a browser core and may also download web applications in the form of HTML, JavaScript, and Flash programs from various Internet web sites. The web browser may run these downloaded web applications locally on top of the browser core. A typical web page contains HTML with embedded JavaScript that can change the HTML being rendered by the web browser dynamically based on user actions without having to re-download the web page from the web server. The HTML may also demarcate part of the web page to be rendered by a plugin, which is typically a separate program that is installed on the computer. Plugins are often downloaded from different sources over the World Wide Web. Thus, a modern computer runs code that comes from a variety of different sources. In particular, application programs may originate from literally millions of different sources once we consider the collection of traditional local applications as well as web applications that are downloaded from websites.

The integrity of a computer system when it runs application code from different sources (or even the same program being run by different users of a shared computer) has traditionally been one of the responsibilities of the OS. The OS uses various hardware and software constructs like virtual memory, processes, and file permissions to prevent code and data belonging to one program (or user) from affecting code and data belonging to another program (or user). This responsibility of the OS to "isolate" programs and data from one another often tends to compete with another responsibility of the OS, which is to allow for co-operation between programs especially between user application programs and system level services such as shared library modules, database services, and other higher-level common OS functionality. These two OS functions, to share and to isolate, require the OS designer to make certain tradeoffs on how much to share and how much to isolate.

As a result of these design tradeoffs, the resulting implementation of modern operating systems has grown to a complexity such that ensuring the OS has no security issues is impractical. In mature operating systems, the security implementation is typically robust enough to work well for normal programs under normal usage with no adverse impact on the operation of the computer. However, most OS implementations are very large and complex bodies of computer code that may not possess a sufficiently robust security system when interacting with programs that are especially designed to take advantage of less-tested or unvalidated corner cases in the operation of the security subsystem.

These "security vulnerabilities" are not important for well-behaved programs during typical operation, but are used extensively by cyber criminals to subvert the computer's security subsystems. Once the system's security is subverted, it is generally possible for cyber criminals to run any software under their control on the subverted computer system.

The Lack of Isolation problem is made worse by the fact that a large amount of code executed by computers today comes from sources outside the computer, some of which have explicit intentions of committing criminal activities. This includes any program downloaded from the Internet or any web site visited by the computer. All downloaded programs (good and bad) have the same OS and library services available to them to use during their operation. Consequently, any program (even malware), can exploit any security vulnerability in the complex OS or web browser environment and subvert the security subsystem that isolates applications from one another. For example, when a user visits a web site, he or she is really running web application code developed by the publisher of the web site. If this web site is malicious, then malware may be executed on the computer. Malware may be designed to exploit a security vulnerability in the web browser to take control of the computer system during subsequent web site visits, e.g., if you visit your bank's web site, your key strokes may be captured and your login/password information for the bank may be transmitted to the malware publisher. Malicious programs may be designed for a variety of purposes, e.g., a malicious program may simply be designed to interfere with the normal operation of a computer rather than extracting useful data from the computer.

While some computer security professionals may understand the existence of the Lack of Isolation problem, this problem is hard to solve in any practical way because preventing applications from working or communicating with each other tends to conflict with achieving the goal of increasing seamless communication between different local and web applications. There has been some work towards the isolation of web code from different sources being run by a web browser. Modern browsers have attempted to create a level of sandboxing around downloaded web application code in order to isolate downloaded code from the rest of the computer and from each other. However, these models are fairly primitive in their ability to deal with the full gamut of security issues that arise during the course of a typical user's web experience. For example, certain versions of Google's Chrome web browser's sandboxing does not address safety issues arising from downloaded browser plugins and various types of native executables; thus, every computer system running certain versions of Chrome is vulnerable to a zero day exploit attack against Adobe Flash or Microsoft Word as much as if the system was running a less secure or older browser with the same Adobe Flash Plug-in or Microsoft Word plug-in.

Web browsers have been burdened with the need to ensure full compatibility to older and non-standard web pages in their efforts to provide superior safety and privacy. For example, web browser programmers have had to make some relaxations in order to correctly render popular web sites that rely on the sharing of information between web sites.

Last but not least, most web browsers vendors suffer from a huge conflict of interest because their business relies upon monetizing the web browsing habits of their users within their own business processes and with their industry partners. This monetization relies on data about users' browsing habits which is contained in the web cookies that are set and later provided to web servers during the course of web sessions. Companies such as Google and Microsoft have a great interest in learning as much as possible about a person's browsing habits and typically arrange the default privacy settings of web browsers to be advantageous to them (but less than optimal from a security and privacy standpoint). This choice of default privacy and core functionality settings causes web browsers to transfer large amounts of sensitive information from end users' machines to Internet related businesses, such as Google, Microsoft, Apple, etc., thereby allowing such businesses to better monetize their customer base by offering appropriate products and services and serving targeted ads. These same settings, however, can be leveraged by malicious parties to exploit security vulnerabilities. While all web browsers provide some level of control to the sophisticated user to tune his or her web browser functionality and/or privacy/safety settings to browse more securely, the vast majority of users never change these default settings.

Some security researchers have also proposed the use of "client virtualization" (also called "Virtualization using a Hypervisor" in the desktop) to solve the Lack of Isolation Problem. In one form of client virtualization, the user runs multiple independent operating systems on their laptop or desktop on multiple virtual machines (VMs) within the client system which have been created using a hypervisor, such as from VMware of Palo Alto, Calif. or Virtual PC, available from Microsoft Corporation of Redmond, Wash. When client virtualization is used to achieve improved security, different VMs are used to run applications from different sources or of different types. For example, an OS in one VM may be dedicated for accessing the corporate network that the user may be part of and running corporate applications (local and web). Another OS in a second VM might be used by the user to run his or her personal programs and store personal documents. Finally, a different OS in a third VM may be used for general web browsing on the wider Internet and running native executables that may have been downloaded from the Internet. An example of such a solution is XenClient, which is made by Citrix Systems of Ft Lauderdale, Fla.

The use of classical client virtualization, as discussed above, to solve the general code isolation problem in the context of Internet endpoints suffers from several drawbacks. A first drawback is that there is too much management overhead for the end-user. The end-user has the onus of making the decision as to what VM to use for each activity. Any mistake, intentional or accidental, may subvert the integrity of the system. While many safeguards can be added as a layer on top of the core virtualization technology to help prevent the user from making mistakes, this has not yet been demonstrated to work in a practical and robust fashion.

An additional drawback is that client virtualization, as described above, suffers from the problem that any VM that is used for general web browsing is just as vulnerable to a security problem as any monolithic system running a single VM while accessing web sites on the general Internet. Therefore, it is quite likely that the VM dedicated to web browsing described in the arrangement above will be subverted by malware eventually. Any subsequent activities in that VM, then, will be compromised.

Due to these reasons client virtualization has not been used widely to improve the security of network activities.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for the handling of network resources in a virtualized computing environment are presented herein. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Functional Overview

Example embodiments relate to management of network resources, in an example embodiment the partitioning of a network in a virtualized computing environment. According to an embodiment, a client executes multiple virtual machines that each may request access to various network resources. In an embodiment, a software component (termed "the Cognitive Assist Module") may assist in the processing of requests for network resources. The Cognitive Assist Module may consult policy data in which various rules and policies are defined for partitioning one or more networks between virtual machines. The policy data may be created by a network administrator and customized at any time. The Cognitive Assist Module may determine, based on the current version of the policy data, whether to allow the virtual machine to access a particular network resource.

If, for example, a second virtual machine makes a request for the same network resource as the first virtual machine, the policy data may define that only one virtual machine may access a particular network resource at any one time, and therefore deny the second virtual machine's request, although the second virtual machine may be allowed access to a network resource that is not coextensive with a network resource currently being access by another virtual machine. In this manner, a network or networks may be effectively partitioned among any number of virtual machines.

Description of Components Residing on a Hardware Device

Figure 1:
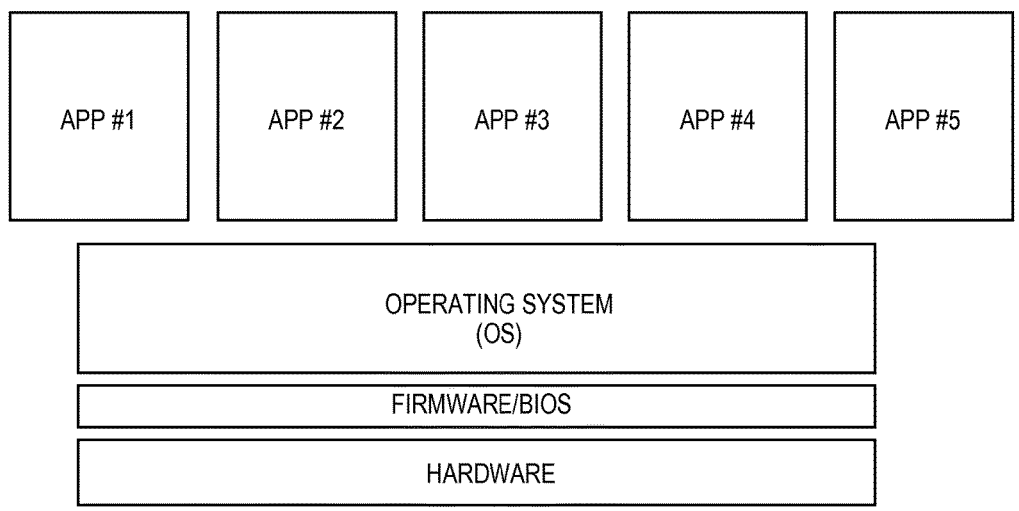
FIG. 1 is an illustration of the layered arrangement of hardware and software present in modern computer systems.
Figure 2:
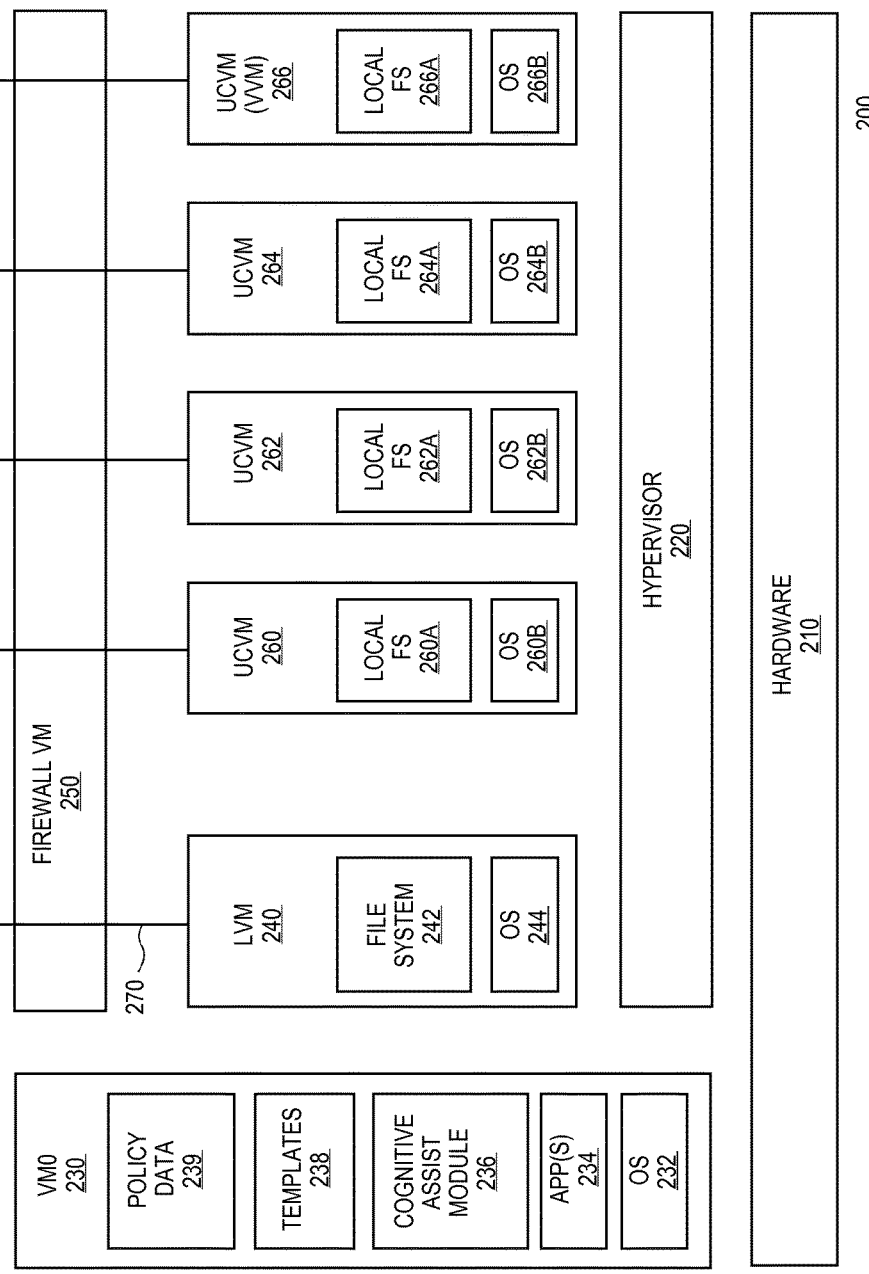
FIG. 2 is an block diagram of the functional components of one embodiment of the invention.

A computer system of an embodiment includes a number of independent virtual machines (VMs) that each executes a full operating system (OS). A block diagram of client 200 according to one embodiment of the invention is shown in FIG. 2. The term "client," as broadly used herein, represents any type of Internet endpoint or computer system capable of connecting to a network and executing a virtual machine. Non-limiting, illustrative examples of client 200 include a PC, a laptop computer, a tablet computer, a cell phone, a personal digital assistant (PDA), and the like.

In an embodiment, client 200 may correspond to a server. Thus, while use of the term "client" in other contexts might exclude an interpretation that includes a server, as broadly used herein, client 200 may be embodied on a wide variety of machines, one example of such being a server. Thus, as the Applicant may be his or her own lexicographer, as used herein, the term client 200 expressly includes a server. For example, non-limiting, illustrative examples of client 200 include a web server, an application server, a file server, a RPD/x-Windows/SSH server, and a cloud server. Indeed, implementing embodiments of the invention upon a server may yield many benefits. The micro-virtualization techniques employed by embodiments provide an efficient mechanism for eliminating the risk of executing untrusted code and/or interpreting untrusted data in accordance with different policies to manage such risk. As such, a device, such as a server, which interacts with (a) numerous sources of untrusted code and/or data and/or (b) two or more corporate entities having different policies towards managing the risk of untrusted code and/or data, may benefit from embodiments of the invention.

Client 200 includes a number of virtual machines (such as 230, 240, 250, and 260, for example) that execute on hardware 210 of client 200. The various VMs within client 200 may be used for separately executing processes associated with different activities. One such VM, namely "VM0" (i.e., VM0 230 of FIG. 2), is secured so that VM0 may serve as the root of trust with a guaranteed integrity. VM0 may contain core operating system 232 and one or more applications 234. In the embodiment shown in FIG. 2, VM0 is not accessible over any network, such as the Internet. As shall be explained below, VM0 provides a secure environment in which operating system 232 and one or more applications 234 may execute without risk of exposure to malicious code.

Other VMs, such as VMs 260, 262, 264, and 266 in FIG. 2, may be created, maintained, and destroyed on-demand using a very efficient micro-virtualizing hypervisor 220. Using efficient micro-virtualization techniques, the latency of starting and stopping activities or applications which run in their own VM in embodiments is very low, thereby providing a practical user experience while employing full OS virtualization.

Embodiments address and overcome many disadvantages, such as the Lack of Isolation Problem, experienced by modern general purpose computer systems that execute code from different sources and of differing trust levels; nevertheless, embodiments maintain compatibility with current typical real-world usage of computer systems by corporate and non-corporate users. This is so because any activity which is not previously deemed trustworthy is performed in a separate VM by certain embodiments, and so all code which may be potentially malicious is executed in its own VM that is destroyed after its immediate use is ended, thereby preventing any malicious code from effecting any lasting change to a computer system according to an embodiment of the invention.

The Trusted Virtual Machine—VM0

In an embodiment of the invention, a special virtual machine, referred to herein as "VM0," is created to be a trusted and secure portion of a computer system. FIG. 2 depicts VM0 230 according to an embodiment. To achieve the property of being trusted and secure, VM0 230 may be permanently disconnected from any network (i.e., VM0 230 is not connected to any local network or the Internet). Specifically, VM0 230 may not contain any type of networking stack, such as a TCP/IP network stack, and may not possess or have access to any networking hardware that could allow for communication between VM0 230 or any applications 234 executed thereby and the Internet. Thus, the only way to install software onto VM0 230 may be to have physical custody of client 200 and manually install the software on VM0 230. Note that a client may contain any number of VM0 virtual machines. While FIG. 2 depicts an embodiment comprising a single VM0, other embodiments may comprise two or more VM0s.

In certain embodiments, one or more applications 234 executing within VM0 230 do not have any access to a network, must be fully self contained in their functionality, and must rely only on local code and data for all their functionality. All applications that need to access the network will therefore need to run in a separate virtual machine outside of VM0 230, as shall be described in further detail below. It is envisioned that the software (such as one or more applications 234) running in VM0 230 be selected at the time client 200 is manufactured or first configured for use in a controlled environment. Because VM0 230 is never connected to any type of network, such as a TCP/IP network, all common types of network initiated attacks cannot be waged against VM0 230, thereby rendering VM0 230 immune to such attacks and safe as compared to any computer or VM that is connected to the Internet. Also, in an embodiment, VM0 230 may execute a different type of operating system than used by UCVMs (discussed below) in client 200. In this way, VM0 230 would be immune or resistant from attacks that typically affect the guest operating systems running in the UCVMs of client 200.

In an embodiment where hypervisor 220 is a Type 2 hypervisor, when client 200 is booted, only VM0 230 is started by the BIOS or firmware of client 200. Once VM0 230 is running, VM0 230 can start hypervisor 220 immediately or on demand. In another embodiment, where hypervisor 220 is a Type 1 hypervisor, hypervisor 220 is first started by the BIOS when client 200 is booted and VM0 230 is launched by the hypervisor 220. Hypervisor 220 is a software component that is responsible for creating other VMs which each execute independent instances of the operating system. These additional VMs are instantiated by VM0 230 and/or hypervisor 220 to run any untrusted code or code that needs to access the network. Untrusted code in this context is any code which has not been pre-approved as being trusted by an IT administrator of client 200. The additional VMs are started "silently" and automatically by client 200, e.g., these VMs are started transparently to the user and without the user having to do anything explicit (note that a user may still manually initiate the creation of a VM in certain embodiments). These additional VMs are also not explicitly visible to the user; instead, all the user sees on the desktop is familiar objects (such as icons, windows, and applications) without any indication that multiple VMs are executing in client 200. Embodiments of the invention follow rules that govern what application activities are assigned to which particular VM. These rules are described below in greater detail.

In another embodiment (not depicted in FIG. 2), VM0 230 may have a networking stack that is firewalled off from the network using well-tested firewall software, thereby allowing VM0 230 to have access to a computer network. Such an embodiment may only allow connections with a specific Internet system so that the software inside VM0 230 may be updated from a designated update server. For example, the firewall software may only allow VM0 230 to connect to one or more servers associated with the IT administrator of client 200 and may prevent VM0 230 from establishing a connection with any other endpoint on any network.

In an embodiment, VM0 230 may communicate with other components of client 200 using secure channels. For example, VM0 230 may communicate with other entities in client 200 using a shared memory channel mediated by a hypervisor. Thus, VM0 230 is not isolated from the remainder of client 200, but nevertheless, processes and data within VM0 230 are resistant from external attacks.

Interaction with an User Interface

All code responsible for generating a user interface (UI) not associated with an application may be maintained in VM0 230. Consequently, all UI interaction activity with the desktop between a user and software executing on client 200 may take place between the user and VM0 230, which maintains a unified desktop for all applications running in all VMs. Interaction between the user and applications running in VMs other than VM0 230 takes place indirectly via VM0 230. For example, when the user enters a password for a web site whose browser and HTML/Javascript code is running in an untrusted VM, the password is first directly provided to VM0 230, which then transfers the information to the untrusted VM. Furthermore, the untrusted VM's display is rendered on to a virtualized display, which is then composed into the VM0 230 desktop (as appropriate) by controlling code running in VM0 230. As code executing in VM0 230 is trusted, the user may trust any user interface controls displayed on a screen since all code responsible for rendering the user interface is trusted.

This approach is quite different from prior systems where often the code that controls the full desktop experience is untrusted. Consequently, if the code responsible for generating the user interface is corrupted by malware, then the user interface may be used as a tool to deceive the user. For example, malware may cause a user interface control to be displayed that requests the user to submit an authentication credential which will be used for improper purposes by the malware. However, this problem is overcome by embodiments of the invention—since all code responsible for rendering user interface controls executes in VM0 in an embodiment, malware is prevented from hijacking or corrupting UI-rendering code.

Figure 7:
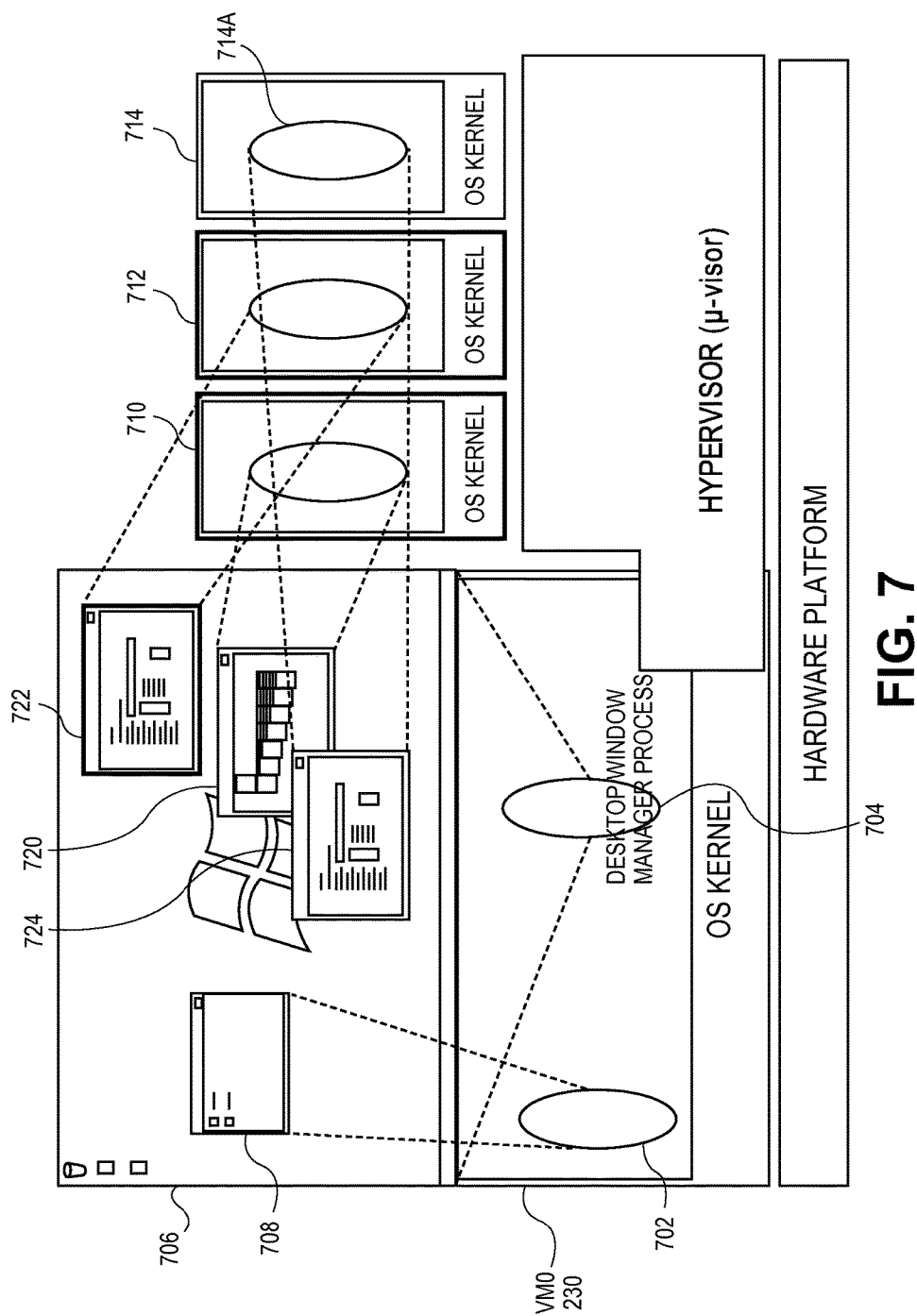
FIG. 7 is an illustration of exemplary desktop of a client according to an embodiment of the invention.
Figure 8:
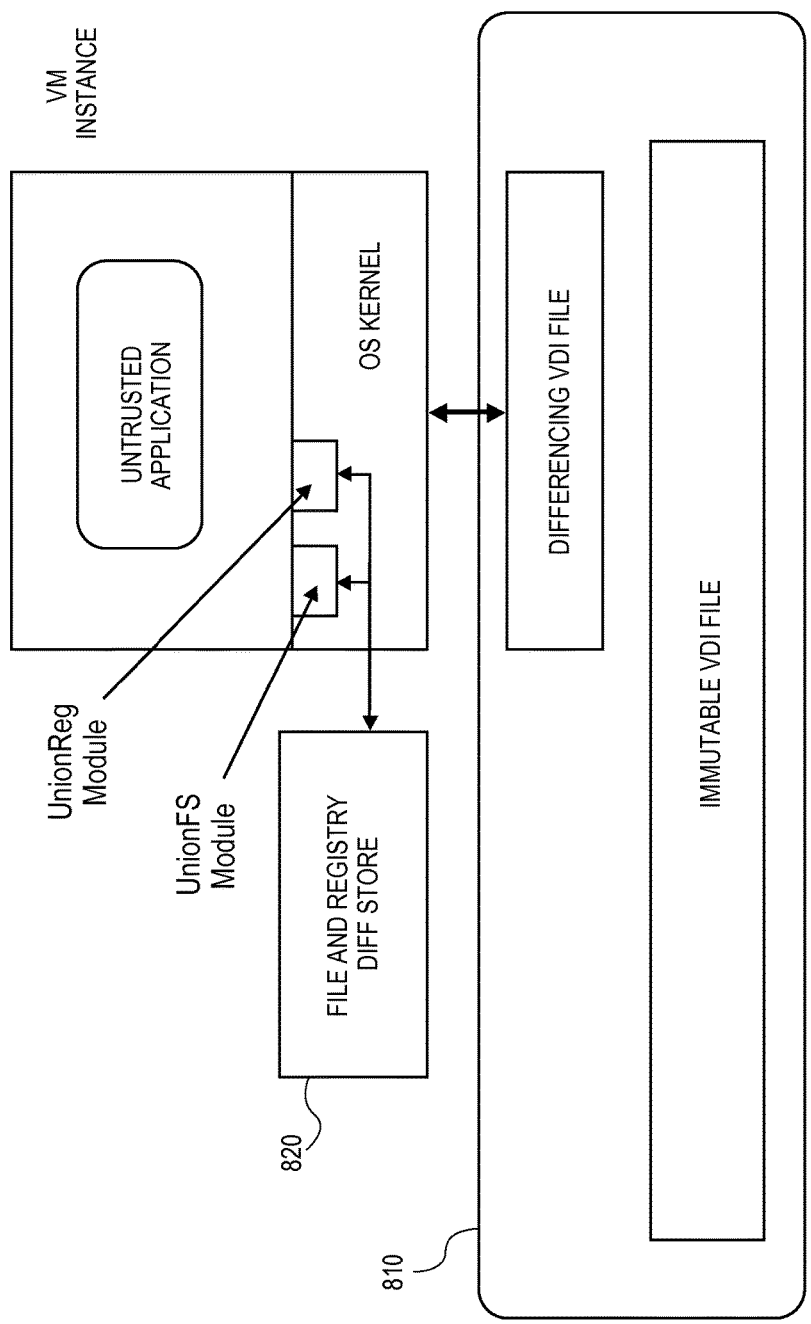
FIG. 8 is an illustration of safely installing an untrusted application according to an embodiment of the invention.

To illustrate an embodiment of the invention, consider FIG. 7, which is an illustration of exemplary desktop of client 200 according to an embodiment. As shown in FIG. 7, process 704 is responsible for rendering desktop 706 on a physical display of client 200. Process 714A runs in untrusted VM 714 and does not have complete access to the file system of client 200. When any process inside VM 714 requests access to the file system of client 200, it is intercepted and process 702 is responsible for rendering a window 708 depicting the contents of the file system of client 200. Process 702 has the option of selectively displaying which contents are available to the VM 714 based on policies as set forth by the IT administrator or the user. VM 710 in FIG. 7 that runs the solitaire game is implemented such that the display of VM 710 is a virtualized display, which is then composed into the desktop 706 (as appropriate) by controlling process 704 running in VM0 230. The displays of VMs 712 and 714 are rendered on the desktop 706 in a similar fashion.

The Legacy Virtual Machine—LVM

FIG. 2 depicts a legacy virtual machine (LVM) 240 according to an embodiment of the invention. LVM 240 may contain operating system 244. LVM 240 serves as the primary entity being managed by the IT administrator of client 200. As such, LVM 240 provides an environment that is analogous to the managed enterprise OS of corporate computer system in that an IT department may install and maintain various enterprise applications within operating system 244 of LVM 240. In an embodiment, operating system 244 of LVM 240 may correspond to a Microsoft Windows OS or any other general purpose OS such as Linux or MacOS.

In an embodiment, LVM 240 is responsible for storing the main file system 242 of client 200. File system 242 may contain the user's profile folder containing the user's settings and files.

LVM 240 typically only runs infrastructure OS programs and programs that are used for the purpose of managing client 200 and trusted enterprise applications. Other user programs (especially those that involve external components or consume untrusted data) do not run in LVM 240, but instead, run elsewhere in separate VMs (such as a UCVM as described in more detail below).

In an embodiment, the network access of LVM 240 is restricted to just the corporate network as implemented by firewall VM 250. Firewall VM 250 is a specialized virtual machine that comprises firewall software/applications to restrict network access of VMs running in client 200 to appropriate and/or necessary network access points. Such practice is consistent with the need for only the responsible IT administrator to be capable of connecting to LVM 240 to manage LVM 240 and processes executing therein.

In one embodiment, LVM 240 and VM0 230 may be implemented in a single virtual machine.

Untrusted Code Virtual Machine—UCVM

When a user wishes to run any application that requires access to either a network or untrusted data (untrusted data is any data that originates from outside client 200), the application is run inside a dedicated VM that is created on-demand by hypervisor 220. This dedicated VM is called an Untrusted Code Virtual Machine (or UCVM). FIG. 2 depicts several UCVMs, namely UCVM 260, 262, 264, and 266. A UCVM operates under the assumption that, in general, any code that connects to the network and interacts with arbitrary code executing on an external device may at some point be compromised. This assumption also applies to trusted applications that interact with data originating from outside the computer system executing the trusted application, because such data may, at some point, contain embedded malicious code. To address such possibilities, such applications are executed in a UCVM to prevent any malicious code, inadvertently introduced into the UCVM, from having the capacity to affect any change outside of the UCVM.

In an embodiment, a UCVM is created by (a) cloning a copy of LVM 240, or a stripped-down version of LVM 240, in memory and (b) providing access to a restricted file system to the newly created UCVM. For example, UCVM 260 comprises restricted file system 260A, UCVM 262 comprises restricted file system 262A, and UCVM 264 comprises restricted file system 264A. Each UCVM possesses its own instance or copy of the operating system, which is isolated and separate from the main operating system (including its code and data) executing within VM0 230 or LVM 240. For example, UCVM 260 comprises operating system 260B, UCVM 262 comprises operating system 262B, and UCVM 264 comprises operating system 264B.

To provide a low latency user experience, UCVMs may not be booted from scratch each time an application is needed to be started. Instead, a UCVM may be created very quickly by cloning the UCVM from a template VM (with a booted OS) that has been pre-loaded in memory at system boot time. In an embodiment, the template used to clone a UCVM may be selected from templates 238 stored in VM0 230. A variety of techniques can be employed to make this cloning operation as fast as a few 100 milliseconds. Multiple types of templates may be used by a system to create UCVMs depending the nature and type of application(s) to be run inside the UCVM, as discussed in greater detail below in the section entitled "Cloning a UCVM from a Template."

Cognitive assist module 236 is software that is responsible for implementing the rules and policies of embodiments as well as helping the user of client 200 in understanding and navigating the security model employed by client 200 on an as-needed basis. Cognitive assist module 236 helps decide what activities run in which UCVMs, including when VMs are created or destroyed, and what kind of access to network and file system resources each UCVM has. Cognitive assist module 236 also helps protect the user, e.g., when a user is fooled by malware running in a UCVM and is in the process of providing some information that they have previously provided to enterprise code running in LVM 240 (for example a password), then cognitive assist module 236 may detect this situation and prevent the user from providing the information (which may be secret corporate information) to the malware.

Regarding the restricted file system of each UCVM, each UCVM has access to a private copy of a subset of the files in file system 242 on client 200. A UCVM may only have access to those files which the UCVM should need for the correct operation of the application executing therein. For example, user files are usually not required for correct operation of an application executing in a UCVM and thus are not typically exposed to a UCVM. On the other hand, if a UCVM is created as a result of the user wishing to edit a document using an application, such as MS Word, then a copy of the document the user wishes to edit will be provided to the restricted file system of the UCVM at the time the UCVM is created. Advantageously, using UCVM 260 as an example, if a process executing within UCVM 260 makes any changes to any files in restricted file system 260A, then these changes do not impact the files stored in file system 242 maintained in LVM 240 because such changes are only made to restricted file system 260A maintained in the UCVM and are not propagated, without express consent from the user, to file system 242 maintained by LVM 240.

In a typical use case of a UCVM, the UCVM may run a local application or an individual web page session. When a user is done running the local application or navigates away from a web page to another page with a different Internet URL domain, the corresponding UCVM is destroyed. Any new local application or web application will be run inside a brand new, separate UCVM that is cloned again from a clean UCVM master template. Thus, if there has been any compromise to the UCVM during the course of running some malicious code that was introduced into the UCVM, then the adverse affects of the security breach are isolated to only the affected UCVM and are lost when the UCVM is destroyed.

For example, assume that a user double-clicks on a MS Word document icon in Windows Explorer. Embodiments create a special UCVM to run the MS Word process. In a particular embodiment, cognitive assist module 236 of VM0 230 may dynamically create the UCVM using a template in one or more templates 238 or use a pre-existing template in memory or on the disk. The template selected by cognitive assist module 236 may be selected based on what activity is to occur within the UCVM, i.e., the selected may be designed to create a UCVM having characteristics that are optimal for running a text editor therein. The created UCVM contains a copy of the operating system as well as a restricted (local) copy of the file system. This local copy of the file system in the UCVM contains all the usual Windows and Program files; however, the user's profile folder in the local copy of the file system contains only the single target MS Word document being opened.

As another example, assume that three tabs are open in a web browser and further assume that each tab is open at a different web page. In consideration of the code which may be contained or embedded on a web page, each web page may be properly considered a web application. In embodiments of the invention, the code responsible for rendering the user interface (UI) of the web browser runs in VM0 230. On the other hand, executable code for the three web applications runs in three separate UCVMs. A core HTML/Javascript engine runs in each of the three UCVMs. A copy of the file system within each of the three separate UCVMs does not contain any part of the user's files, as they are not required for the task performed by each UCVM, namely displaying a web page. Thus, each web application (or web page in this example) is completely isolated from the rest of the system.

In an embodiment, a UCVM may be connected to the Internet according to an access policy determined by the nature of the code running within the UCVM. To illustrate, web pages are typically restricted as per a strict "same origin policy" similar to the rules implemented by modern web browsers. In the "same origin policy," scripts running on web pages are permitted to access methods and properties of other scripts originating from the same site with no specific restrictions, but are prevented from accessing most methods and properties across web pages on different sites. Untrusted native applications running outside of the web browser are restricted by default to be able to connect only to the domain from which the program was downloaded (and to specific content delivery networks (CDNs) that may be in use by the domain in question).

This level of network access for downloaded applications can be explicitly changed (increased or decreased) by the end-user to include additional sites on the Internet. End-user control over what a UCVM can connect to may be subject to certain limitations related to corporate networks and sensitive web sites (such as a bank and web mail provider). For example, any code running in a UCVM may not, in general, access any site on a corporate Intranet to which client 200 is connected. Applications that need to connect to the corporate Intranet may need to be signed by the IT administrator of the domain. Similarly, non-web untrusted application code in a general UCVM may not connect to a web site associated with a search engine or bank or other sites that may have been previously identified as being "off limits." These connections can only be made through a web browser (which spawns UCVMs bound to these special domains) or from a special purpose LVM called a VVM, which described in further detail below.

In an embodiment, there is no communication channel available for an application running in one UCVM to communicate with an application running in another UCVM. Thus, applications running in UCVMs are completely isolated from each other and from the other applications in the system. This is well suited for running downloaded third party local applications which are generally designed to be self-contained or for Internet applications (web pages are not supposed to rely on any communication between applications within the web browser). In an alternate embodiment, communication between an identified set of virtual machines can be enabled by a person with sufficient privileges, such as an IT administrator for client 200.

Firewall Virtual Machine

In an embodiment, the implementation of the network access restrictions is done in a dedicated VM called a firewall VM. FIG. 2 depicts an exemplary firewall VM 250 of an embodiment. Firewall VM 250 runs an isolated operating system with a dedicated and fixed set of firewall applications that implement the network access policy for all VMs in client 200 (except perhaps VM0 230, which may not have any network access). Firewall VM 250 may provide, to any virtual machine running on client 200 in which untrusted code is executed or untrusted data is being interpreted, restricted access to only those network resources deemed necessary on an as-needed basis in accordance with a policy described by policy data 239 stored on client 200.

In another embodiment of the invention, the firewall functionality of the system may be co-located and implemented inside either the hypervisor 220 of FIG. 2, or inside the LVM 240 of FIG. 2 (working in conjunction with the hypervisor 220 of FIG. 2), or inside VM0 230 of FIG. 2 (working in conjunction with the hypervisor 220 of FIG. 2).

Validated Virtual Machines—VVMS

UCVMs are not appropriate to run local applications that interact heavily with each other using local APIs such as COM, as typically there is no communication channel available for an application running in one UCVM to communicate with an application running in another UCVM. Embodiments may employ one (or more) special UCVMs called a Validated Virtual Machine (VVM) for the purpose of running relatively trusted local applications that have complex interactions between the applications. Such complex interactions are common in enterprise frameworks containing multiple applications, such as Microsoft's Office Suite and IBM's Lotus Notes.

FIG. 2 depicts an exemplary VVM 266 of an embodiment. Note that while FIG. 2 depicts a single VVM for ease of explanation, other embodiments of the invention may employ two or more VVMs or no VVMs based upon the particular needs of the user and/or policies of the organization responsible for or the owner of client 200.

Applications need to be signed and configured for co-location in the same VM by an administrator of client 200 before they can run in VVM 266. Inside VVM 266, signed applications can interact with each other using all types of APIs and frameworks supported by the OS being used. In an embodiment, the default network access policy of a VVM is to allow access to a corporate network only. The IT administrator may increase or decrease this level of access, subject to certain restrictions.

In an embodiment, specific signed applications or suites (groups of applications) that originate from a trusted source (other than the enterprise) may also be designated to run together in a particular VVM responsible for applications originating from that source. For example, all non-corporate applications that are signed by a specific vendor may be run together in a single VVM. These applications would then be isolated from corporate applications and general untrusted applications, but not from one another. A specific network access rule that is more permissive than the "same origin policy" used for web applications and unsigned applications may be used for a VVM. The restricted copy of file system 242 exposed to a VVM is similar to that exposed to a generic UCVM in that the restricted copy of file system 242 exposed to a VVM comprises only those files related to, or required for, performance of the applications executing within the VVM.

The Restricted File System Exposed to a VM

Figure 3:
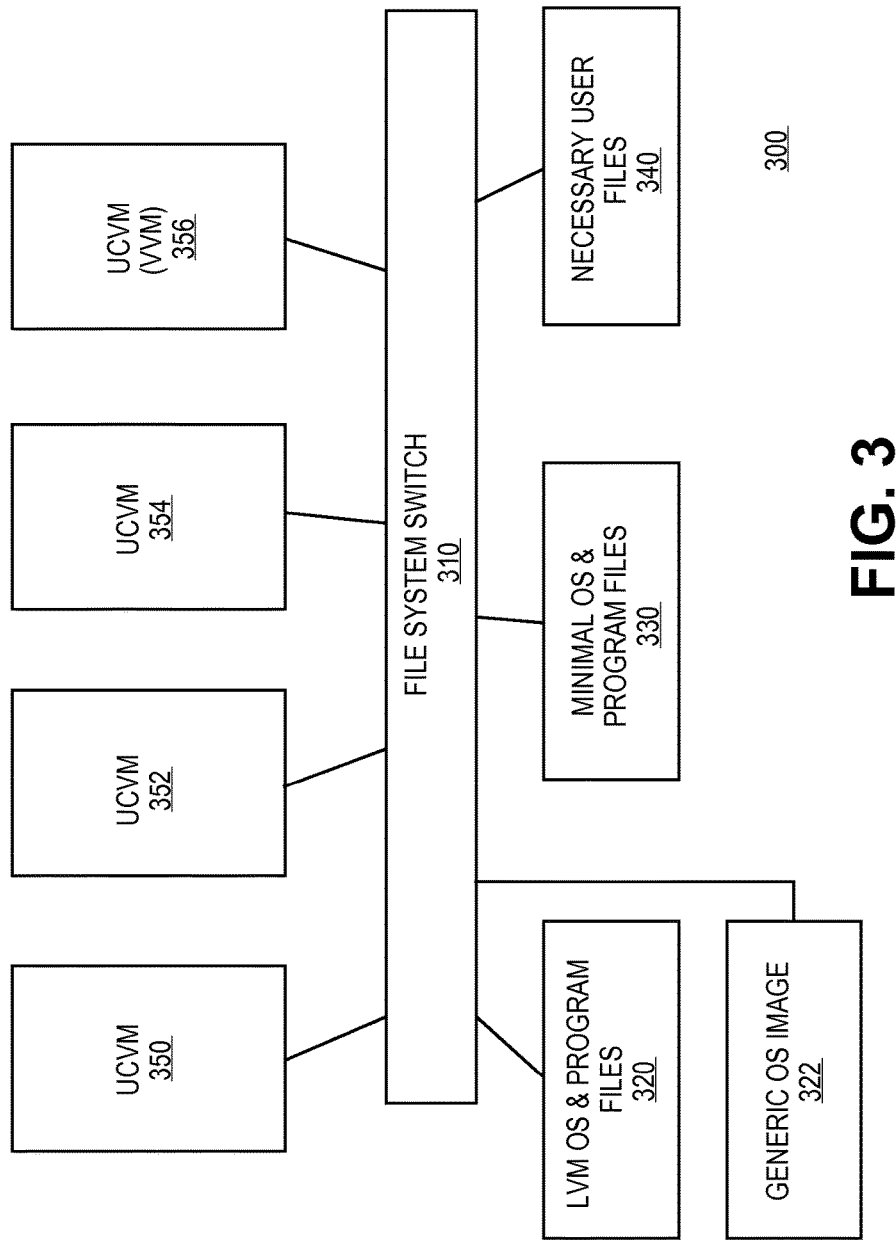
FIG. 3 is block diagram of the functional components involved in exposing a restricted copy of the file system to different UCVMs (and VVMs) according to an embodiment of the invention.

FIG. 3 is block diagram of the functional components involved in exposing a restricted copy of file system 242 to different UCVMs (and VVMs) according to an embodiment of the invention. File System Switch 310 is software that is configured to provide the newly created UCVM with access to a copy-on-write clone of the OS image that the UCVM was created from once the UCVM has started. The minimal operating system and program files 330 in the copy-on-write clone may be created from either the corporate LVM OS image 320 or a separate generic stripped down OS image 322 which may be created by the IT administrator.

Furthermore, a newly created UCVM is provided a copy of necessary user files 340, which are a subset of the user files in file system 242. The composition of necessary user files 340 will be different for each user. The set of files comprising the user files in file system 242 maintained in LVM 240 are typically those files in the user's home folder, e.g., c:\Users\<username>. The particular copies of files that are provided to a particular UCVM as necessary user files 340 are the minimum set of files that are needed by that UCVM to accomplish what the user intended to do as captured when the target application was being invoked. For example, if the user double clicked on a specific MS Word file named ABC.docx at the location c:\Users\<username>\Documents in the file system 240 maintained in LVM 240, then necessary user files 340 would only include a copy-on-write clone of the ABC.docx file and only this copy-on-write clone of the ABC.docx file is made available in the virtual c:\Users\<username>\Documents folder made visible to the newly created UCVM running the MS Word application. If a program (like MS Word) was started without any association with a file, then necessary user files 340 would correspond to an empty c:\Users\<username>\Documents virtual folder.

Any application running in a UCVM therefore only has access to the particular set of user files provided explicitly by the user when the program was invoked. Subsequently, if the user wants to browse file system 242 for another file from within the application (for example, by using the File→Open menu item of MS Word), then he or she will see a restricted user files directory.

Figure 4:
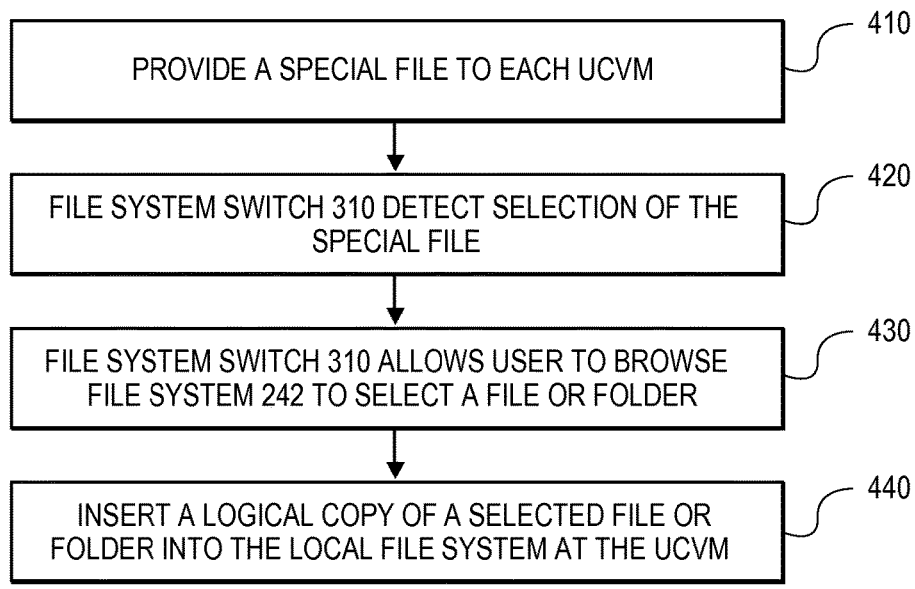
FIG. 4 is a flowchart illustrating the steps involved in a UCVM obtaining a copy of a new user file maintained in the file system stored elsewhere according to an embodiment of the invention.
Figure 5:
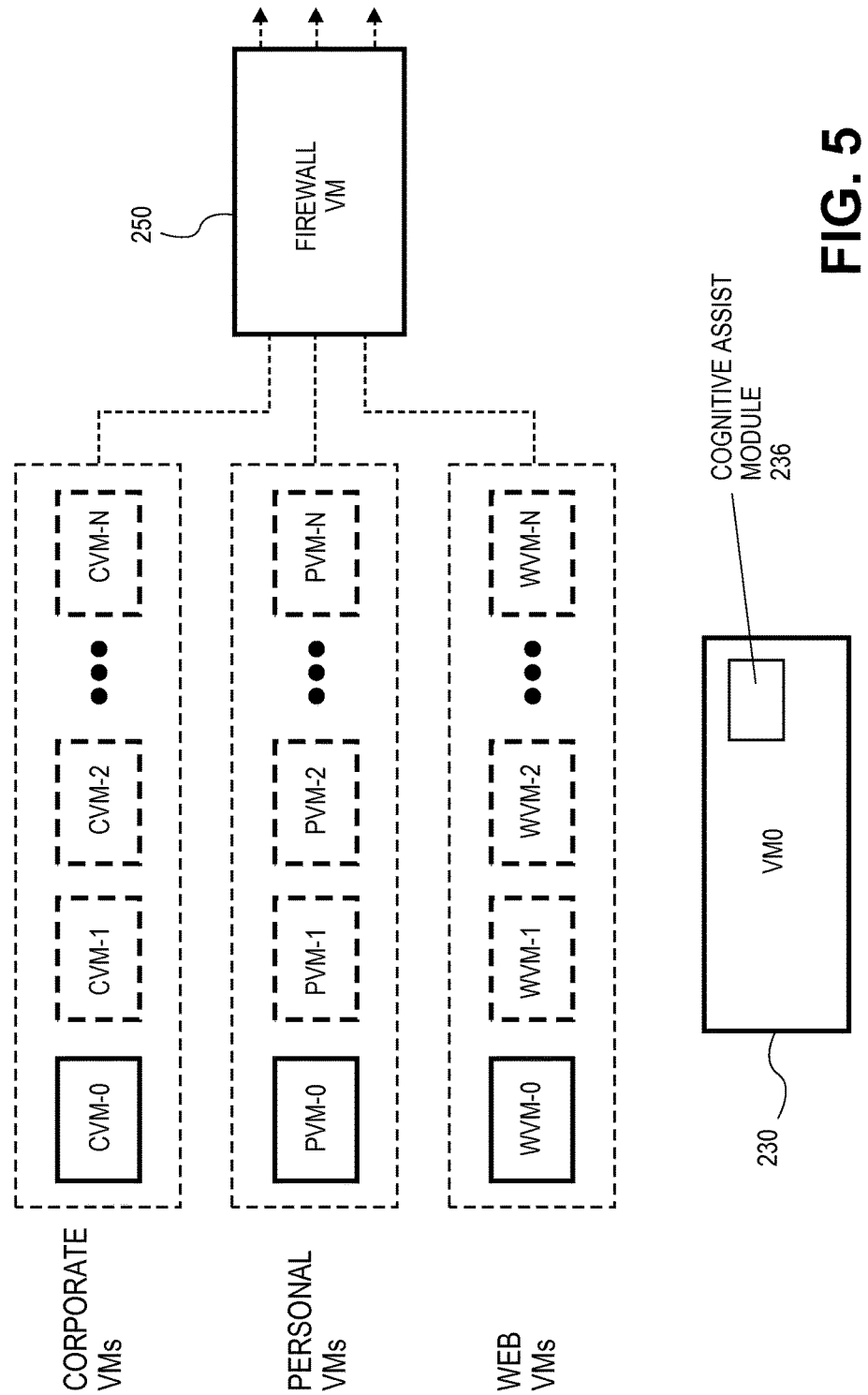
FIG. 5 is an illustration of instantiating a plurality of different virtual machines using different templates according to an embodiment of the invention.
Figure 6:
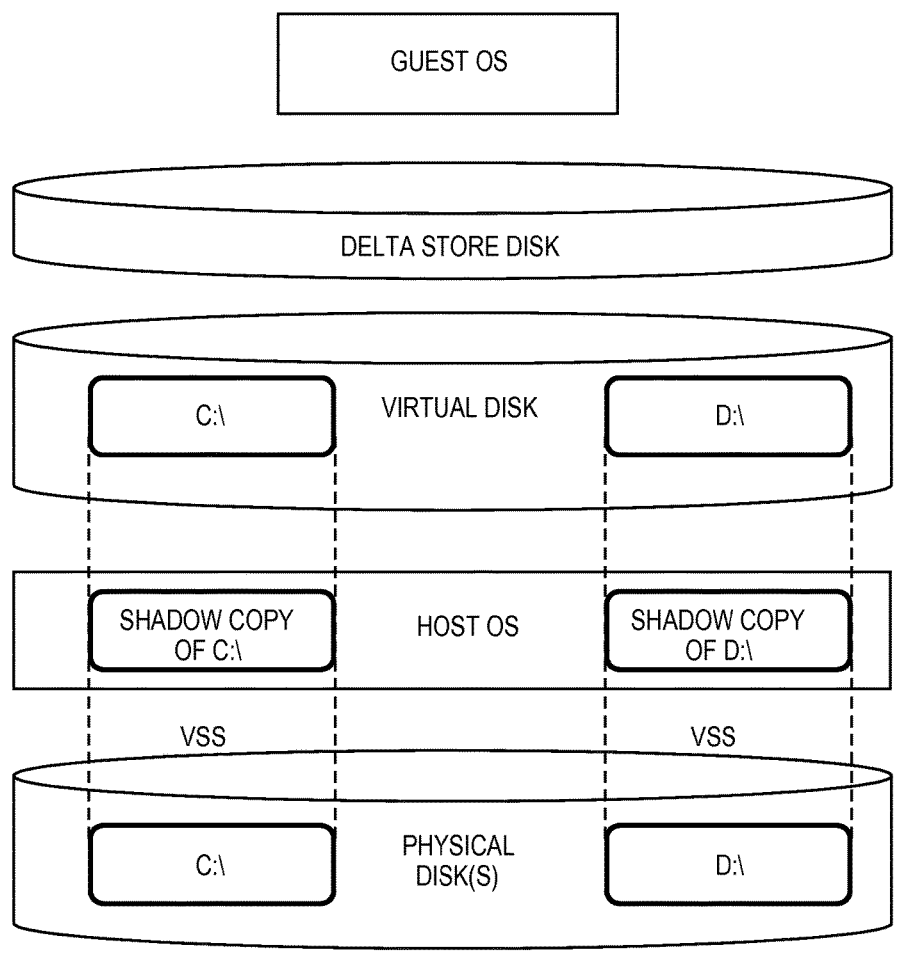
FIG. 6 is an illustration of a virtual disk based on VSS shadow copies according to an embodiment of the invention.

To enable the user to select files from the user's own User Files folder in file system 242 maintained in LVM 240 using an application executing within an UCVM, a user interface may be provided to allow the user to browse his or her files in file system 242, select one or more of the user files, and expose a copy of the selected files to the appropriate UCVM. For example, FIG. 4 is a flowchart illustrating the steps involved in a UCVM obtaining a copy of a new user file maintained in file system 242 according to an embodiment of the invention. In step 410, a special file is provided to each UCVM. The special file may be provided to the UCVM in a number of different ways, e.g., the special file may be inserted into each folder of the virtual C:\Users\<username> directory provided to each UCVM. This special file may be named something akin to "Show All My Files" or the like, as its selection will be used to trigger exposing additional copy-on-write clones of files stored in file system 242 to the UCVM.

In step 420, File System Switch 310 detects when the special file is selected by the user. For example, when a program executing within a UCVM browses to the special file, presumably as a result of a user click, this action may be trapped by File System Switch 310.

In step 430, File System Switch 310 invokes a dialog with LVM 240 that allows the user to browse the full file system 242 maintained in LVM 240. The user may then select a file or folder in file system 242. Note that at this stage, the user may be granted read access to the full file system 242 for purposes of selecting a file or folder, but the user is not granted write access to file system 242. Therefore, the user is prevented from modifying file system 242 maintained by LVM 240 in any way.

In step 440, after the user selects a file or folder, a copy of the selected file or folder is created. The copy of the selected file or folder is then inserted into the restricted file system associated with the UCVM. As a result of inserting the copy of the selected file or folder in the restricted file system associated with the UCVM, an application executing in the UCVM may have read and write access to the copy of the selected file or folder in the virtual file system, but is prevented from effecting any change to the original copy of the selected file or folder in file system 242 maintained by LVM 240.

The steps of FIG. 4 ensure that files in file system 242 maintained by LVM 240 are not visible to a UCVM without explicit permission from the user. Malicious code running in a UCVM, for example, cannot programmatically access files in file system 242 in LVM 240. Further, malicious code running in a UCVM also cannot render a false user interface to trick the user into unintentionally providing any user files to the malicious code, since all code responsible for rendering the user interface is maintained within VM0 230, and thus, unreachable and un-hackable by the malicious code.

File System Switch 310 may be implemented in a variety of ways. For example, in one embodiment, File System Switch 310 may be implemented by a network file system protocol (NFS or CIFS may be used). A special VM (or LVM 240) may be used as the OS serving the "User Files" shared file system. Other VMs "mount" this shared file system using NFS or CIFS (or another network file system) from the hosting VM. Application software in the hosting VM may decide what files are exposed to which VM based on instructions provided by VM0 230.

In another embodiment, File System Switch 310 may be implemented, in part, by a proprietary protocol for handling communications between the different UCVMs and File System Switch 310. File System Switch 310, in such an embodiment, may be implemented as part of a special VM or in LVM 240.

Security Afforded by Embodiments

Embodiments of the invention provide a secure environment to prevent malicious code from affecting any lasting change in a computer system. Arbitrary code (either a web application or a native executable) runs inside an isolated operating system running on an isolated virtual machine. This code has no access to any other application (either a native application or a web application) being run by the user because those applications run in other operating systems running in separate virtual machines. Moreover, arbitrary code has access to only the specific part of the file system that is needed for correct execution of the code. Access to additional parts of the file system has to be provided by code that runs in VM0 (which is secure and fortified against unauthorized intrusion) and any increased access needs explicit authorization from the human user.

Specific trusted code that needs to interact in a complex way with other applications may be explicitly designated to run together inside the same designated VM. This type of VM also has limited access to the file system.

All code and files have limited network access to just what that code needs for its correct execution. All virtual machines are created from templates stored in VM0 which are either immutable or can be updated in a very controlled fashion. Consequently, if a security bug exists in a piece of code, the effect of the security bug is isolated ("space limited") because the compromised code has access to only a limited part of the file system, the network, devices, etc. Moreover, the effect of the security bug is "time limited" because the virtual machine that has been compromised will be subsequently discarded and a new virtual machine is created for future application instances from a clean immutable VM template.

Using Policy Data to Manage the Deployment of Virtual Machines

Embodiments allow code that originates from arbitrary external sources to be safely executed by a client. In this way, digital content of unknown trustworthiness may be safely received and potentially executed and/or interpreted by a client without incurring the risk that the digital content contains malicious code that could cause undesirable consequences.

The 'digital content' received by the client from an external source may correspond to any type of digital data, such as executable code or non-executable, interpreted data for example. Since malicious code may be carried within certain types of non-executable data and subsequently spread when the data is interpreted by applications, embodiments treat all incoming digital content as being capable of containing malicious code, even if the digital content is not in a recognized executable form. Non-limiting, illustrative examples of digital content include an ".exe" file, an application, a collection of applications designed to run together, a portion of an application, an email attachment, a slide presentation, a text document, and a web page (which essentially is a portion of an application, namely a web browser). Even though the email attachment, the slide presentation, and the text document, in and of themselves, are not executable files, embodiments of the invention treat these forms of digital content as potentially carrying malicious code.

To manage the risk posed by receiving digital content of unknown trustworthiness, any digital content received by a client is stored in one or more virtual machines. In an embodiment, digital content received from an external source may immediately be stored in one or more virtual machines upon receipt. Alternately, digital content received from an external source may be stored in an intermediate location, such as a local cache, prior to storing the digital content in a virtual machine.

While embodiments are configured to process all digital content originating from an external source in a virtual machine, the complexity of determining in which virtual machine the digital content should be stored and how that virtual machine should be configured is hidden from the user whenever possible or appropriate. To accomplish this goal, techniques are discussed herein for programmatically managing a plurality of virtual machines on the client to accommodate the wide variety of use cases for receiving digital content at a client. However, in some cases, explained in more detail below, it may be appropriate to inform the user of certain activity concerning a virtual machine, such as when obtaining express permission from the user is advisable before performing an action.

Certain sources of digital content are more trustworthy than other sources. For example, the web site of a bank or Fortune 500 company may be more trustworthy than the web site of a smaller company or lessor known organization. Also, applications may have different operating needs, e.g., certain applications may be designed to work closely with other applications or require access to network resources. Thus, in an embodiment, the attributes of each virtual machine are specifically tailored to reflect the type of digital content and/or applications operating or stored therein.

To illustrate how one embodiment operates, when a client determines that digital content, originating from an external source, is to be received or processed by the client, the client may identify, without human intervention, one or more virtual machines, executing or to be executed on the client, into which the digital content is to be received. To do so, the client may consult policy data, such as policy data 239 stored at client 200 of FIG. 2, to determine a placement policy, a containment policy, and a persistence policy used in identifying the one or more virtual machines into which the digital content is to be received.

The policy data may be used to specifically tailor the operation of each virtual machine to reflect the type of digital content and/or applications operating or stored therein. The placement policy identifies a particular virtual machine into which the digital content is to be stored, the containment policy identifies what network resources and client resources the particular virtual machine can access, and the persistence policy identifies whether data (or a part of it) stored in the particular virtual machine is persistently stored. Naturally, the placement policy, containment policy, and persistence policy are, to a certain extent, intertwined, as the resources a virtual machine may access and whether data stored therein is persisted will affect what applications/ digital content are appropriate to reside therein.

In an embodiment, each of the placement policy, the containment policy, and the persistence policy may consider a variety of different factors. For example, the placement policy, the containment policy, and/or the persistence policy may consider a historical record of use for the client in identifying a virtual machine. The evaluation of a policy may involve consulting a historical record of how the client, or applications running thereon, has been used. In this way, if a particular action has been judged to be more safe (or less safe) over a period of time, the manner in which the action is handled by the policy may evolve over time. To illustrate, in an embodiment, if a particular network resource, such as an affiliate corporate web page, is demonstrated to be sufficiently safe over a period of time, then this web page may be processed using relaxed restrictions, e.g., by a web browser in a virtual machine already handling another trusted web page as opposed to instantiating a new virtual machine to handle the affiliate corporate web page. On the other hand, if the historical record of use demonstrates that an action involving a particular network resource or client resource may pose some risk to the client, then the policy may subsequently handle this action more sensitively than before, e.g., by assigning code to handle the particular network resource or client resource in a dedicated virtual machine with restricted access to client and network resources.

As another example of the types of factors which may be considered by a policy, one or more of the placement policy, the containment policy, and the persistence policy may consider a current physical location of the client or to which networks the client currently has access in identifying one or more virtual machines which should be used to receive content. In this way, which networks are available to the client, the IP address assigned to the client, the current location of the client based on global positioning service (GPS) data, and the current location of the client based on an IP address or which networks are available to the client may all be considered when determining which virtual machine should receive digital content and what restrictions should be placed on that virtual machine. In this way, when the client is physically located in an area deemed safe (such as a work office or home), digital content received by the client may be handled by a virtual machine having a set of lesser restrictions than when the client is physically located in an unknown area.

As another example of the types of factors which may be considered by a policy, one or more of the placement policy, the containment policy, and the persistence policy may consider the proximity of the client to a wireless device, such as a Bluetooth enabled cell phone. For example, if the client is not within a configurable distance to the cell phone of the user of the client, then the client may receive digital content using a set of greater restrictions, e. g., code executing in all virtual machines may be denied access to certain client resources and/or all network resources. Embodiments may determine whether the client is within a configurable distance to a wireless device using a variety of different methods, such as accessing the wireless signal strength between the client and the wireless device.

In an embodiment, at least a portion of the policy data, used in identifying one or more responsible virtual machines to receive digital content, is obtained from a remote server after the client determines that digital content is to be received from an external source. In this way, policy data may be sent, as needed, from an IT administrator to the client. The client may treat any policy data already residing on the client in the same manner as policy data retrieved from a remote server. For example, when a user of the client performs an action, the client may consult a remote server to see if the remote server has any additional policy data regarding this action. Following this procedure, an IT administrator can maintain a high level of control on how the client will manage virtual machines running on the client. This enables the IT administrator to make adjustments to the security model followed by the client in real-time. The client may interact with a human operator at a remote location to obtain additional policy data or may interact with a remote automated system, without human intervention, to obtain the additional policy data. Note that certain embodiments may be configured to consult a remote server for policy data only when a certain configurable action is taken. Therefore, in certain embodiments, the client need not always contact a remote server to determine if additional policy data is available each time that the client is to receive new digital content.

In an embodiment, the policy data may specify that the virtual machine assigned to receive digital content can only access a limited subset of the metadata properties for a client resource or a network resource. For example, a virtual machine may not be capable of determining what local wireless networks are available in the vicinity or whether the network card of the client is of a particular type. In this way, the amount and type of information exposed to a particular virtual machine may be controlled to a fine level of granularity.

Use of the placement policy, the containment policy, and the persistence policy by certain embodiments will be discussed in further detail below.

Placement Policy

The placement policy identifies a particular virtual machine into which the digital content is to be stored. The particular virtual machine identified by a placement policy in which digital content is to be stored may be an existing virtual machine or a new virtual machine that has not yet been instantiated. In the case where the placement policy specifies that the digital content should be received by a virtual machine that has not yet been instantiated, either the placement policy itself or some other location in the policy data will identify a template for use in instantiating the particular virtual machine. The identified template will describe characteristics of a virtual machine suitable for receiving the digital content.

The placement policy may weigh a variety of different considerations in determining which virtual machine should store the digital content so that the digital content may be safely executed, interpreted, and/or processed. For example, a placement policy of an embodiment may assign any file having a certain name or certain attributes to a virtual machine having certain characteristics. To illustrate, a placement policy may indicate that all signed executable files from an internal organization or company are to be assigned to a virtual machine having a specified set of characteristics.

As another example, the placement policy may instruct untrusted applications to execute in separate virtual machines so that each untrusted application is isolated from other applications and data of the client.

The placement policy of an embodiment may identifies a plurality of classes of virtual machines, where each class of the plurality of classes is associated with a different trust level for external sources of digital content. Code executing in a virtual machine cannot access external sources associated with less trustworthy external sources of digital content. For example, assume there are three classes of virtual machines, where the first class of virtual machines is designed to run web browsers accessing web sites of financial institutions and email providers, the second class of virtual machines is designed to run web browsers accessing web sites of Fortune 500 companies, and the third class of virtual machines is designed to run web browsers accessing all other web sites. In this example, a web browser executing in a virtual machine that is associated with the third class cannot access any web sites from Fortune 500 companies or financial institutions and email providers. Similarly, in this example, a web browser executing in a virtual machine that is associated with the second class cannot access any web sites from financial institutions and email providers.

The placement policy of an embodiment may identify the particular virtual machine into which the digital content is to be received by observing application dependencies. Such a policy recognizes that in some instances, it is helpful or even necessary to execute certain applications within a single virtual machine. For example, certain providers of software applications may design their software applications do work together or integrate with each other to a high degree. In this case, it would be advantageous to have applications that are designed to work together to run within a single virtual machine. One way for the placement policy to make this determination would be to ask the user whether an application being installed is dependent upon another application already installed at the client to ensure that both applications may be run in the same virtual machine. While this does expose the notion of a virtual machine to the user, a user need only make a decision of this nature when an application is installed on the client, and thus, this decision may be made by IT administrators or other knowledgeable personal rather than relying upon the end user of the client to make such a decision.

Alternatively, determining whether an application being installed is dependent upon another application may be made programmatically by examining the dependencies during the installation of that application. For example, during the installation of application A, the install process may check if module B is already installed or may require that module B already by installed. In this example, the placement policy may determine then that application A has a dependency with module B and may therefore allow application A to run in same virtual machine as module B.

To illustrate another example, it is initially noted that there need not be a one to one correspondence between a web browser and a web page. For example, a web browser may comprise many tabs, and each tab may display a different web page. In addition, each web browser may have a variety of different plug-in and/or associated programs which may be treated as or considered a separate application. Since a web browser may display multiple web pages of varying trust levels, it is desirable to accommodate a web browser having multiple tabs without requiring that the web pages displayed by each tab reside in the same virtual machine. For example, if a web page contains malicious code, then it would be beneficial to execute it in a different virtual machine from the virtual machine containing the web page of your bank. Therefore, in an embodiment, the placement policy may specify that web page of certain sources should be received in a separate virtual machine. While the user may see a single web browser having two tabs, on the back end this may be implemented in two separate virtual machines that each execute a copy of the web browser and possess one web page to be shown in associated with one tab of the web browser. A practical implementation of web page placement may use a VM per web-site placement policy.

These are merely examples of how a placement policy may be implemented. It is contemplated that actual implementations of a placement policy will be configured based upon the particular needs and concerns of the end user. The containment policy of certain embodiments will now be presented in greater detail.

Containment Policy

The containment policy identifies what network resources and client resources a particular virtual machine can access. Network resources, as broadly used herein, refers to any resource that is external to the client while client resources, as broadly used herein, refers to any resources that is internal to the client. A client resource may include any device, component, and/or data residing on or accessible to the client, such as a digital camera, a network interface card, a digital clock, the current time, files, pictures, and email.

The containment policy is used to ensure that code running within a virtual machine has access to only those resources deemed necessary for normal and intended operation. For example, email attachments should not need access to the Internet (generally speaking), and so they should be opened in a virtual machine that is configured such that it does not have access to the Internet. Contain policies may be used to ensure that the resources of the client that are accessible to a virtual machine are those resources necessary to perform the activity intended to be performed within, e.g., a virtual machine instantiated to open a file may only have access to resources necessary to open, view, and edit the file.

In an embodiment, the containment policy may specify what portion of the network that is available or exposed to code executing within a virtual machine. For example, the containment policy may specify that code executing within a particular virtual machine may access no network resources, all network resources, or a subset of the network resources. Thus, a containment policy may specify that code executing within a virtual machine may access a first set of network resources and may not access a second set of network resources. Embodiments may specify what particular network resources are available to a virtual machine using any level of granularity, e.g., only certain types of network resources may be exposed, only certain properties of network resources may be exposed, or only certain portions of the network may be exposed.

In an embodiment, enterprise applications may be grouped into collections. Groupings may be based on a variety of factors, such as job functions or business unit, for example. Each grouping of applications may be executed within a single virtual machine according to an embodiment.

To illustrate the interaction between the containment policy and client resources, the containment policy of an embodiment identifies each client resource accessible to a virtual machine. For example, a containment policy may specify whether code executing in the particular virtual machine can perform one or more of the following actions:

access a USB port on the client, perform a copy operation or a paste operation, access a network to which the client is connected, access a GPS device of the client, location information for the client, or tilt information for the client, access a printer or facsimile machine to which the client is connected, and access a digital camera or screen data for the client. Note that these exemplary actions are not meant to provide an exhaustive list, as a containment policy may be used to specify, with particular specificity, which client and network resources may be accessed by code executing within a virtual machine. In this way, if a new client resource becomes available, such as fingerprint scanning device, the containment policy may be updated to reflect the new client resource available to the client.

In an embodiment involving the receipt of executable code at a client, the containment policy may specify that the executable code is denied access to a user file without first obtaining a user's permission to allow the executable code to access the user file. In this way, virtual machines may be configured to allows request permission each time executable code therein access a user file, thereby allowing the user to be informed of the intentions of the executing code and presumably prevent unauthorized access to the user's own files. Such a permission scheme might be implemented naturally as part of the normal user work flow of picking a file to open by running the permission code in a clean protected VM separate from the VM running the untrusted code which is making the request.

To illustrate the interaction between the containment policy and network resources, the containment policy of an embodiment identifies whether code executing in a particular virtual machine can one or more networks accessible to the client. As another example, the containment policy of an embodiment identifies which, if any, objects stored over a network the virtual machine can access. For example, a virtual machine may be restricted to access a specified set of objects or files on a particular server or a particular set of web pages.

In an embodiment, the containment policy may consider any number of factors, including but not limited an identity of the user of the client, a set of properties of the digital content, a physical location of the client, the current time, a holiday schedule, and a set of administrator-specified policy rules. In this way, the containment policy may assign a virtual machine having more restrictions than usual to receive digital content when the digital content is deemed more likely to contain malicious code. For example, it may be deemed likely that digital content contains malicious code when it is received by the client outside of normal business hours, over a holiday, at a time when the client is outside of the user's home or work office, or when the digital content has certain suspicious properties. In this way, the containment policy may assign suspicious digital content to be received in a virtual machine having additional restrictions appropriate for such suspicious digital content.

These examples of how a containment policy may operate and merely illustrative of some examples and are not intended to be an exhaustive list, as actual implementations of a containment policy will be configured based upon the particular needs and concerns of the end user. The persistence policy of certain embodiments will now be presented in greater detail.

Persistence Policy

In an embodiment, the persistence policy identifies whether data stored in a particular virtual machine is persistently stored. The policy grapples with the issue of whether or not to save state created by untrusted code and if so, whether the state should be stored in an isolated manner or merged back into the main file system of the computer. On one hand, to provide a convenient user experience, it may be helpful to persistently store cookies for a web site. On the other hand, it would not be desirable to persistent malicious code, such as a key logger, that was inadvertently introduced into a virtual machine by malware downloaded into and run in the affected virtual machine.

The persistence policy, hand in hand with the placement policy, should be designed to ensure that any potentially malicious code is not persistently stored, or in the alternative, persistently stored in an isolated way. This way, if malicious code, such as a key logger, is persistently stored, and in any future invocation (execution or interpretation), it is invoked (executed) in the context of a possibly new virtual machine instance separate from any other code, thereby nullifying the risk presented thereby.

To illustrate an illustrative persistence policy, in an embodiment only cookies and cache files are persistently stored in a virtual machine in which a web browser executes. Further, the cookies and cache files associated with a particular web site are only inserted to a virtual machine that is intended to execute a web browser displaying that web site. Thus, cookies and a cache file associated with site A would not be inserted into a virtual machine instantiated to run a web browser to display web site B, but would be inserted into a virtual machine instantiated to run a web browser to display web site A.

The above discussion of a persistence policy is exemplary of certain embodiments and is not intended to describe all implementations of a persistence policy, as a persistence policy will be configured based upon the particular needs and concerns of the end user.

Unified Display

Even though there may be a plurality of virtual machines executing at the client, this complexity need not be exposed to the end user of the client. Thus, the end user should be presented visual content generated from each virtual machine executing on the client in a unified manner to present a single, cohesive presentation to the end user of the client. The presentation of the content should be seamless and close to native as possible.

For example, the end user of the client should interact with a web browser that looks like a known web browser, even though the web browser, at the back end, is implemented using a plurality of virtual machines to execute copies of the web browser and different web pages corresponding to each tab of the web browser.

Network Partitioning

As discussed above with regard to "Containment Policy," code executing within particular virtual machines may have varying degrees of network permissions; for example, ability to access network resources such as web pages, FTP servers, other trusted or untrusted virtual machines (e.g., VM0, LVMs, UCVMs), and/or the host OS of a client running in relation to a type 1 or type 2 hypervisor. As an example, a document opened in a virtual machine may be restricted from accessing any network resources, limited to accessing a subset of available network resources, or able to access all available network resources, depending on the implementation of various policies. These policies may be understood as being represented by the term "policy data," although it is understood that the chosen term implies no limitation on the form of how the policies are represented, stored, implemented and/or managed. Policy data may be policy data 239 stored on client 200, as discussed with reference to FIG. 2. Policy data may describe one or more policies desired for client 200 or a virtual machine executing on client 200 from a source such as an owner or responsible organization of client 200. Policy data may be maintained by VM0 230 or LVM 240, for example in certain embodiments, although any number of locations for policy data 239 are envisioned, including locations external to client 200. For purposes of the present disclosure, it should be understood that all aspects of network and virtual machine monitoring, management and partitioning as discussed herein may be managed with the use of policy data. While specific examples may be provided, lack of reference to the use of policy data as applied to a specific example implementation should not be construed as a limitation upon its use.

Because access to an unmanaged network such as the Internet is a primary attack vector for malware and other types of insidious exploits, it is desirable to manage the resources of a virtualized computing system such that virtual machines are carefully controlled, in one example according to policy data, so that security threats arising from network access may be minimized. As an example, a host OS or a trusted virtual machine (such as VM0 230 of FIG. 2) may be disallowed by policy from accessing network resources on an unmanaged network, as well as be shielded from code executing on an untrusted virtual machine (such as a UCVM) that has been granted access to network resources on an unmanaged network. In an example that will be discussed more fully herein, a virtual machine that is executing code obtained from an unmanaged network, for example rendering an Internet web page, may be disallowed from accessing a host OS, trusted virtual machine or certain network sections.

While the Internet is an example of a network which may be referred to as "unmanaged" or "untrusted," other networks may be considered "managed" or "trusted," depending on how the respective networks are designated by policy data. For example, a corporate intranet may be designated as a "trusted" network, such that a virtual machine executing on a client may have fewer restrictions on its level of access to network resources. In example embodiments, a trusted virtual machine may be allowed to connect to a trusted network and may be allowed to access network resources in this trusted network.

Figure 9:
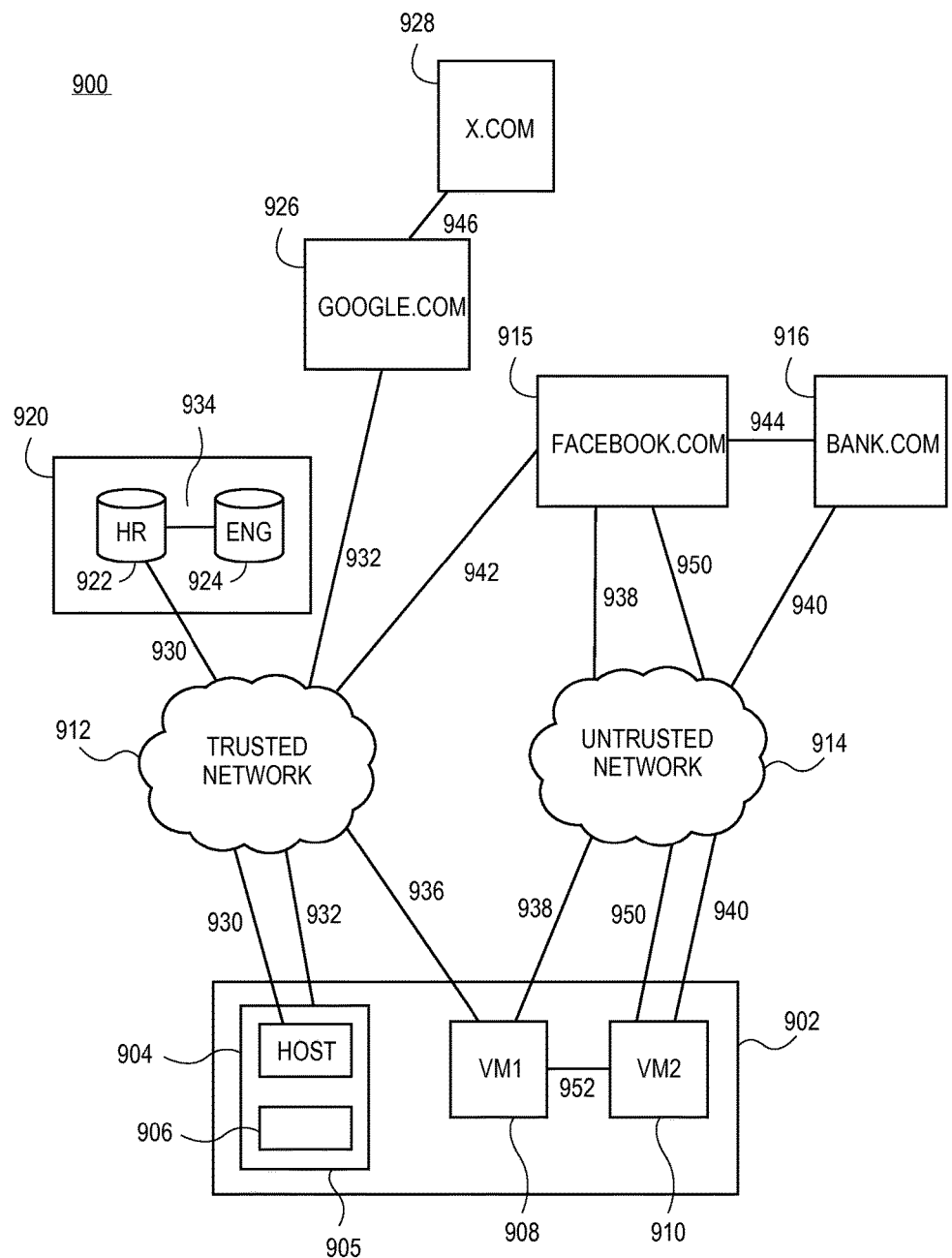
FIG. 9 is a an illustration of an approach for network partitioning according to an embodiment of the invention.

The approaches described herein allow for the efficient and customizable management of one or more networks and/or network resources available to virtual machines executing on a host. FIG. 9 is an illustration of an approach for network partitioning according to an example embodiment. In the example of FIG. 9, two virtual machines, VM1 908 and VM2 910, are executing on a client 902. While it may be understood that VM1 908 and VM2 910 may be operationally similar to any of a UCVM, VVM, LVM or VM0 as discussed previously, for purposes of certain examples they may be thought of as UCVMs, in that they are untrusted code virtual machines spawned for a single task, to access network resources. Client 902 also may comprise a Cognitive Assist Module 904, which may be understood as Cognitive Assist Module 236 as discussed with regard to FIG. 2, among other places, and policy data 906. While reference may be made to the Cognitive Assist Module with regard to the approaches described herein, it should be understood that the underlying functionality may be performed by another module or a collection of resources. A Cognitive Assist Module in any specific form is not required for the performance of the techniques described herein, and therefore the existence or lack thereof of a Cognitive Assist Module in the context of the present disclosure should not be construed as a limitation upon the functionality of any example embodiments. It should be understood that, as described earlier, Cognitive Assist Module 904 may be located within, communicatively coupled to, and/or functionally similar to VM0 or other modules that provide operational control of any virtual machines executing on client 902 as well as managing aspects of network access for components executing on client 902. Additional modules not explicitly shown in FIG. 9 may also be included in the client 902 in other implementations; for example, firewall VM 250, referenced with regard to FIG. 2, may be executing on client and may assume some or all operational responsibilities of Cognitive Assist Module 904. Some or all modules described with regard to FIG. 9 may be combined in alternate embodiments.

According to the example embodiment of FIG. 9, two networks are available: trusted network 912 and untrusted network 914. While trusted network 912 and untrusted network 914 are depicted as being two separate networks in FIG. 9, in alternate embodiments they may be combined as one network, there may only be one of trusted network 912 and untrusted network 914, or there may be additional networks available. In the example embodiment of FIG. 9, trusted network 912 represents a corporate intranet and untrusted network 914 represents unfettered access to the broad Internet, for example through an unsecured public Wi-Fi connection. Other example networks are envisioned.

The parameters of networks such as trusted network 912 and untrusted network 914 may be defined by a user, such as an administrator, and these parameters may be stored on the client, for example in policy data 906. As an example, an administrator may define a trusted network as comprising a set of IP addresses to which a client may connect, or domain names representing a network to which client may connect, such as bromium.com. An administrator may define an untrusted network as another set of IP addresses, for example all IP addresses not specifically defined as part of a trusted network, or a list of domains to which virtual machines on client 902 have access to. Other techniques known in the art for defining networks and assessing their trusted or untrusted status are envisioned and may be utilized with respect to the present approaches.

In an example, VM1 908 may make a request for access to a network resource (e.g., a web page) that is processed by Cognitive Assist Module 904. Cognitive Assist Module 904 consults policy data 906 to determine whether to allow VM1 908 to access the network resource, for example based on where the request is directed. As a result of consulting policy data 906, Cognitive Assist Module 904 (or an equivalent module as described earlier) either allows VM1 908 to access the requested network resource or not. An example of the consulting step may be Cognitive Assist Module 904 determining that the network resource requested by VM1 908 is to a resource located at an IP address in a block of IP addresses previously identified by an administrator as being acceptable; therefore the request may be allowed according to policy data 906 as long as client 902 is connected to a trusted network 912 such as the corporate intranet. If the IP address had been in a block of IP addresses blacklisted by policy data 904, access would be denied.

Another example is Cognitive Assist Module 904 determining that the network resource requested by VM1 908 is to "google.com," which may be allowed if an administrator had so indicated in policy data 906. Another example is Cognitive Assist Module 904 determining that the network resource requested by VM1 908 is to an IP address typed into an address bar of a web browser executing in a virtual machine, which in an example may be allowed because policy data 906 indicates that requests for IP addresses are disallowed unless the IP address was typed into a web browser address bar or similar target. In this example, the key is assessing whether a user intentionally desired to connect to an IP address, because malware often attempts to connect to IP addresses without being detected. Because Cognitive Assist Module 904 controls the functionality of all virtual machines executing on client 902, such a determination is possible.

In the example of a network resource being requested via an IP address, Cognitive Assist Module 904 may try to resolve the IP address by querying a DNS server. Policy data 906 may require that the DNS server be a trusted name server, such as a DNSSEC server. In response to the DNS server resolving the IP address, Cognitive Assist Module 904 consults policy data 906 to see if the resolved domain is allowed, and based on this information, Cognitive Assist Module 904 allows or denies the request.

In an example embodiment, client 902 may begin operation only having access to untrusted network 914; however, as client 902 is transported, for example a laptop being carried from a coffee shop into a user's workplace, client 902 may gain access to trusted network 912 and lose access to the original untrusted network 914. In an example, client may also gain access to a new untrusted network, for example via a tethering connection to the user's mobile device. According to an embodiment, if client 902 is connected to a trusted network, then one policy in effect, and if client 902 is connected to an untrusted network, then another policy may go into effect. As an example, client 902 may be a laptop computer connected to an untrusted network such as a Wi-Fi connection in a coffee shop. Cognitive Assist Module 904 detects that client 902 is not connected to a trusted network, for example because an authenticated connection has not been established with, for example, the trusted Windows Domain Controller through the Wi-Fi network. Therefore, Cognitive Assist Module 904 may put certain policies into effect for virtual machines executing on client 902. For example, some or all virtual machines may only be allowed to connect to certain network resources, or only accept connections on certain ports, or only exchange network traffic utilizing certain protocols. Another example policy is that no virtual machine is allowed to communicate with the host or another virtual machine, nor would a virtual machine be allowed to contact certain network resources defined in policy data 906 as being off-limits to a virtual machine connected to an untrusted network. Additionally, all access to and from the host may be denied until a connection to a trusted network is made.

In this example, the user of client 902 shuts his laptop and travels to work, where client 902 connects to a trusted network (e.g., the corporate intranet). This trusted network may be determined for example by trying to authenticate with a Windows Domain Controller through the connected network. Cognitive Assist Module 904 detects the change in networks and consults policy data 906, and as a result may change the permissions previously put in place for virtual machines executing on the client 902. For example, now that a trusted network in connected, the host may be allowed to connect to certain network resources, such as a corporate server or code repository.

In an example embodiment, client 902 is able to detect the presence of networks, both gaining access to new networks and losing access to old networks. According to an example embodiment, it may be determined whether a particular network is actually a trusted network pursuant to policy data 906. One way of doing this is to examine the IP address of the network and compare it to entries in policy data 906; however, it is possible that a malicious network may spoof a trusted network. For example, company ABC.com may define its trusted network (e.g., its intranet) as ABC.com and/or as a block of IP addresses. If a client 902 detects a network conforming to the definition of the ABC.com trusted network, it should confirm that the network to which it is about to connect is really the ABC.com trusted network and not a malicious network spoofing the IP addresses defined as belonging to the ABC.com trusted network or an infiltrated DNS server resolving requests to ABC.com to a false block of IP addresses actually belonging to a malicious network.

By detecting that the network which appears to be the ABC.com trusted network actually is the ABC.com trusted network, then policy data defining normal access parameters under those circumstances may be implemented; otherwise, policy data defining a heightened level of security may be implemented. Illustrative examples of how the authenticity of a network may be determined include the use of a "beacon," pinging a particular server, and/or successfully authenticating with a Windows Domain Controller which is normally present only on the inside of an enterprise network.

According to an example embodiment, a virtual machine may request access to a particular network resource, and in response, Cognitive Assist Module 904 determines the source of the request, for example a web page being rendered in the virtual machine, and determines whether the source of the request is trusted or untrusted, for example by consulting policy data. Cognitive Assist Module 904 then consults policy data 906, which in this example defines particular sections of various networks and contains associated access rules for each section; for example, one section might be an arbitrarily defined set of network resources like web domains or IP addresses, another section might be an Intranet (which may be identified by authenticating with a trusted Windows Domain Controller, among other approaches), another section might be the entire Internet or any network that isn't my Intranet. Based on the trusted or untrusted nature of the source of the request, potentially along with the particular section to which the request corresponds, appropriate action regarding the request may be taken by Cognitive Assist Module 904 based on policy data 906.

With regard to the sectioning of networks and access rules based on that, one example may be that any website not in "N" section is not allowed to communicate with an Intranet, as well as no VM rendering outside content may be allowed to talk to an Intranet (or any network which may be defined in policy data 906). A policy may be that guests (e.g., UCVMs) may only connect out, not to other guests or to network sections which are disallowed.

Example of Network Partitioning

Turning now to the example embodiment illustrated in FIG. 9, client 902 is connected to a trusted network 912 and an untrusted network 914. VM1 908 executing on client 902 makes a request for network resources; for example, a user opened a web browser and typed in "facebook.com." The request is received by Cognitive Assist Module 904, which consults policy data 906 to determine whether the request will be granted or denied. In this example, policy data 906 contains an entry that indicates "facebook.com" is an allowed site; therefore, Cognitive Assist Module 904 provides VM1 908 with the access to the requested network resources. A connection 938 is initiated over untrusted network 938 between VM1 908 and "facebook.com" 918. In this example, the connection is made over untrusted network 938 because policy data 906 indicates that all untrusted virtual machines may only connect to networks other than the trusted network 912. According to this policy, if VM1 attempted to connect 936 to trusted network 912, Cognitive Assist Module 904 would disallow the connection. In this manner, trusted networks are protected from untrusted virtual machines.

In the example of FIG. 9, VM2 910 makes a request for network resources; e.g., a second tab is opened in the web browser executing in VM1 908 and "bank.com" is entered into the browser address bar. Pursuant to the techniques previously described, a new virtual machine (VM2 910) is instantiated to handle the operation. Cognitive Assist Module 904 receives the request and consults policy data 906 to determine how to service the request. Assuming "bank.com" is an allowed domain for an untrusted virtual machine to access pursuant to the policies in place, Cognitive Assist Module 904 processes the request and allows VM2 910 to connect 940 to bank.com 916.

Now that VM1 908 is connected 938 to "facebook.com" 918, and VM2 910 is connected 940 to "bank.com" 916, we turn to an example that additionally illustrates a partitioning aspect of the described approaches. As previously discussed, data may flow on the connection 938 between facebook.com 918 and VM1 908 and the connection 940 between VM2 910 and "bank.com" 916; however, in this example, "facebook.com" 918 attempts to connect 942 to trusted network 912. Because the policy data in this example mandates that a virtual machine may only access a single network resource, the attempted connection 942 is denied by Cognitive Assist Module 904 after consulting policy data 906. Additionally, policy data 906 may mandate that no guest virtual machine is allowed communicate with a particular set of network resources; for example, IP addresses defining the trusted network 912. In that case, the attempted connection 942 would similarly be denied. It may be the case that a network administrator would desire to allow either of the previous two actions to occur; therefore, policy data 906 may so indicate, and as a result, the attempted connection 942 may be allowed. Next, VM2 910 may make a request for a separate connection 950 to "facebook.com" 918; however, a policy definition could be in place that states that a virtual machine may only have one active connection to one network resource, or that only one connection between client 902 and a particular network resource is allowed; therefore, the connection could be disallowed based on the policy data. In one example, VM2 910 makes a second request for a different network resource than is being accessed by any other virtual machine, and if the policy data allows such access, the request may be granted.

Next, VM1 908 that is connected 938 to "facebook.com" 918 attempts to connect 944 to "bank.com" 916 that is connected 940 to VM2 910. This connection could be attempted for several reasons. For example, a user typing "bank.com" in the browser address bar, or "facebook.com" 918 legitimately attempting to pull information from "bank.com" 916, or an advertising banner ad being displayed, or even a malicious attempt by a compromised website to access financial data. Cognitive Assist Module 904 receives the request to connect to "bank.com" 916 and consults policy data 906 to determine if the connection is to be allowed. There are many examples of criteria that could be listed in policy data 906 to be consulted in whether or not to allow some or all of the data transfer. For example, the communication protocol used in the connection 944 could be examined. If the HTTPS protocol is being used, then the connection could be disallowed, one rationale being that anything being transmitted via HTTPS contains valuable information. If two connections are being made using HTTP and HTTPS respectively, then the HTTPS connection could be allowed and the HTTP connection disallowed or vice versa. As another example, the MIME type of the request 944 could be examined and only certain document types allowed to be transferred; for example, images may be allowed while application data types are disallowed. The port on which the connection 944 is made could be examined; connections on port 80 being allowed and any other port disallowed. VM2 910 that is connected 940 to VM2 910 may attempt to connect 944 to "facebook.com" 918, for example by a user clicking a "Like" button on the "bank.com" 916 website. This could be allowed by policy definitions, while similar attempts to connect to other social media sites are disallowed on a site-by-site basis.

Via the approach of Cognitive Assist Module 904 monitoring and being aware of network activities of virtual machines under its supervision and consulting customizable policy data 906, a network may be effectively sectioned and partitioned between virtual machines executing on a client. This includes monitoring a request from VM1 908 to connect 952 directly to resources of VM2 910 and vice versa. One example would be VM1 908 attempting to communicate with a web page being rendered in VM2 910. In response to receiving such a request, Cognitive Assist Module 904 may consult policy data 906 to determine whether to allow the connection 952. As a result, VM1 908 is partitioned from VM2 910, neither potentially being allowed to access each other or any network resources other than those associated with their original requests, and the network resources not being coextensive. Pursuant to policy data, this relationship between the virtual machines may be altered in any way, including being based on criteria such as the network client 902 is connected to at the time, proximity of client 902 to certain things, for example a user's cellphone as determined by the strength of the network connection between client 902 and the cellphone or any other technique known in the art.

Continuing with the example of FIG. 9, a trusted virtual machine or host 905 (in which Cognitive Assist Module 904 may be executing, or Cognitive Assist Module 904 and host 905 may be one element, or host 905 could be an element of a host OS, according to example embodiments), or a trusted VM such as VM0, or similar entity may attempt to connect 930 to a corporate server 920 over trusted network 912. In response to this request, Cognitive Assist Module 904 consults policy data 906 to determine how to respond to the request. In this example, policy data 906 contains a definition that a trusted VM may connect to a particular trusted network resource, for example corporate server 920 over a trusted network 912, and therefore the connection is allowed. The policy could also define that no untrusted virtual machine, such as VM1 908 and VM2 910 is allowed to access the particular network resource; as a result, corporate server 920 is effectively sectioned off from untrusted virtual machines.

The network partitioning defined by policy data 906 may be even more granular; for example, a connection 930 from a trusted virtual machine or host 905 to corporate server 920 may be allowed, but only to a particular portion of the corporate server 920, for example an HR database 922. An Engineering database 924 on server 920 may be effectively partitioned via policy, both from a direct attempt at connection by host 905 or a secondary connection 934 from the HR database 922 to Engineering database 924. This provides a granular level of security for even portions of a corporate network resource from a compromised client 902, trusted virtual machine 905 or trusted network 912.

While policies may be implemented to prevent the host or a trusted virtual machine 905 from connecting to any web site or IP address not within a trusted network, a policy may be created allowing a virtual machine, including a trusted virtual machine, to connect to the Internet, for example if the trusted virtual machine is connected to a trusted network 912. In this example, host 905 makes a request for a connection 932 to "google.com" 926. According to an example embodiment, network resources may be sectioned in a group of "high value sites." A specific list of high value sites may be configured by the IT administrator of the company in question, or by the end-user. High value sites may comprise a list of site descriptions. For example, an IT administrator might determine that "*.salesforce.com" is high-value, and a user might determine that "*.wellsfargo.com" is high-value. According to an embodiment, virtual machines such as UCVMs that render such sites can talk to these network addresses, but no other virtual machine can. In this example, "google.com" 926 is listed as a "high value site" and therefore the connection 932 is allowed. If a subsequent connection 946 is requested, for example to "x.com" 928, this may be disallowed per policy based on any number of customizable rules.

Figure 10:
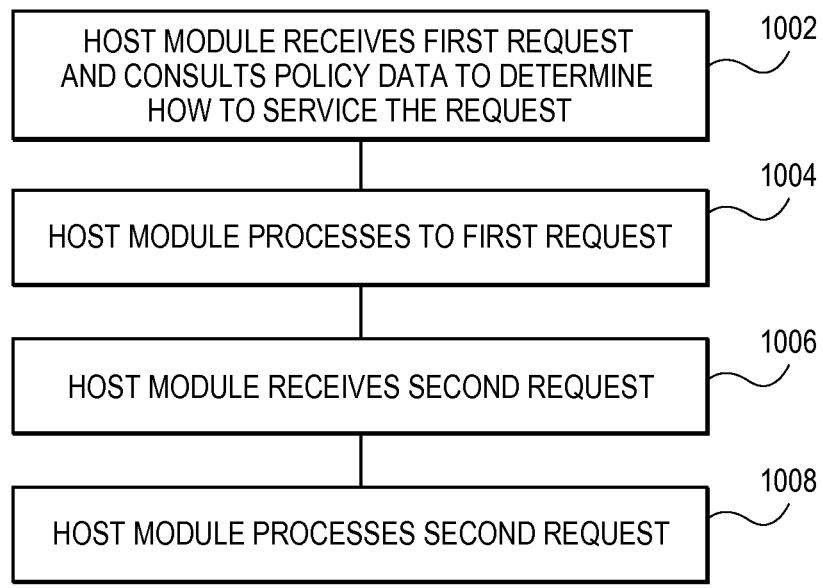
FIG. 10 is a flowchart illustrating the high level functional steps of partitioning of network resources in a virtualized computing environment according to an example embodiment.

FIG. 10 is a flowchart 1000 illustrating the high level functional steps of partitioning network resources in a virtualized computing environment according to an example embodiment. In step 1002, a Cognitive Assist Module receives a first request for network resources from a first virtual machine, and in response to receiving the request, the Cognitive Assist Module consults the policy data to determine whether to allow the first request. According to an example, the request may comprise and/or result from input of an IP address, for example by a user into an address bar of a browser or a terminal access mechanism, and the policy data contains information regarding access rules for such a scenario. According to another example, the request may comprise and/or result from a resolved DNS query, for example by a user providing an IP address or web address that is then transmitted to a DNS server (which may be trusted or untrusted), and based on how the DNS query is resolved, the policy data contains information regarding access rules for such a scenario.

In step 1004, the Cognitive Assist Module processes the first request by allowing the first virtual machine to access the requested portion of network resources. According to an example, the policy data indicates that a single virtual machine may only access a single portion of network resources; therefore, Cognitive Assist Module prevents the first virtual machine from accessing any other portion of a network.

In step 1006, the Cognitive Assist Module receives a second request for network resources from a second virtual machine, and in response to receiving the second request, the Cognitive Assist Module consults the policy data to determine whether to allow the second request. In step 1008, the Cognitive Assist Module processes the second request by allowing the second virtual machine to access the requested portion of network resources. According to an example, the Cognitive Assist Module prevents the second virtual machine from accessing any other portion of network resources, similarly with respect to the first virtual machine. Additionally, the policy data may contain a definition that no two virtual machines may access the same portion of network resources at the same time; therefore, in this example, the first portion of network resources accessed by the first virtual machine could not be coextensive with the second portion of network resources accessed by the second virtual machine.

According to an example embodiment, access to network resources by the first and second virtual machines may be accomplished by providing the first virtual machine with access to a first virtual network interface and providing the second virtual machine with access to a second virtual network interface. In some embodiments, both virtual machines may access the same virtual network interface or a physical network interface. In an embodiment, the virtual network interfaces are implemented using one or several physical network interfaces, which may be communicatively coupled to a client.

According to an example, requests for access to network resources by a virtual machine may occur is numerous ways. A user may type a web address into a browser address bar, a web page rendering in a virtual machine or other code executing in a virtual machine may request access to various network resources, for example images from an image host, or access to a third-party website, such as with a Facebook "Like" button. A link in a document being viewed in a virtual machine may be clicked and a network request spawned as a result. As a result of policies, network containment may be accomplished based on any number of criteria, such as what applications are being executed, what is the origin of the request (typed IP address, resolved network address, clicking a hyperlink, etc.), who is a particular virtual machine currently or previously communicating with, etc.

Figure 11:
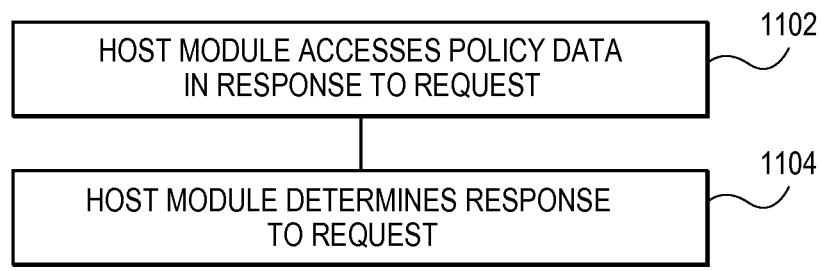
FIG. 11 is a flowchart illustrating the high level functional steps of partitioning of network resources in a virtualized computing environment according to an example embodiment.

FIG. 11 is a flowchart 1100 illustrating the high level functional steps of partitioning network resources in a virtualized computing environment according to an example embodiment. In step 1102, a Cognitive Assist Module receives a request from a virtual machine to access a particular network resource on a network. In response, the Cognitive Assist Module accesses policy data to identify where the request is directed; for example, the network may be partitioned into any number of arbitrary sections, as expressed by portions of the policy data that may be provided by a network administrator. If the virtual machine is requesting access to "google.com," then the Cognitive Assist Module accesses the policy data and identifies which network section "google.com" belongs to, as defined by the policy data.

Based on the Cognitive Assist Module identifying which section the request is directed to, in concert with the policy data, the Cognitive Assist Module may determine whether to allow the virtual machine to access the requested network resource.

Thus, methods and systems for approaches for the handling of network resources in a virtualized computing environment have been described. Although the present subject matter has been described with reference to specific example embodiments, it will be evident that various modifications and changes may be made to these embodiments without departing from the broader scope of the subject matter. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Hardware Mechanisms

Figure 12:
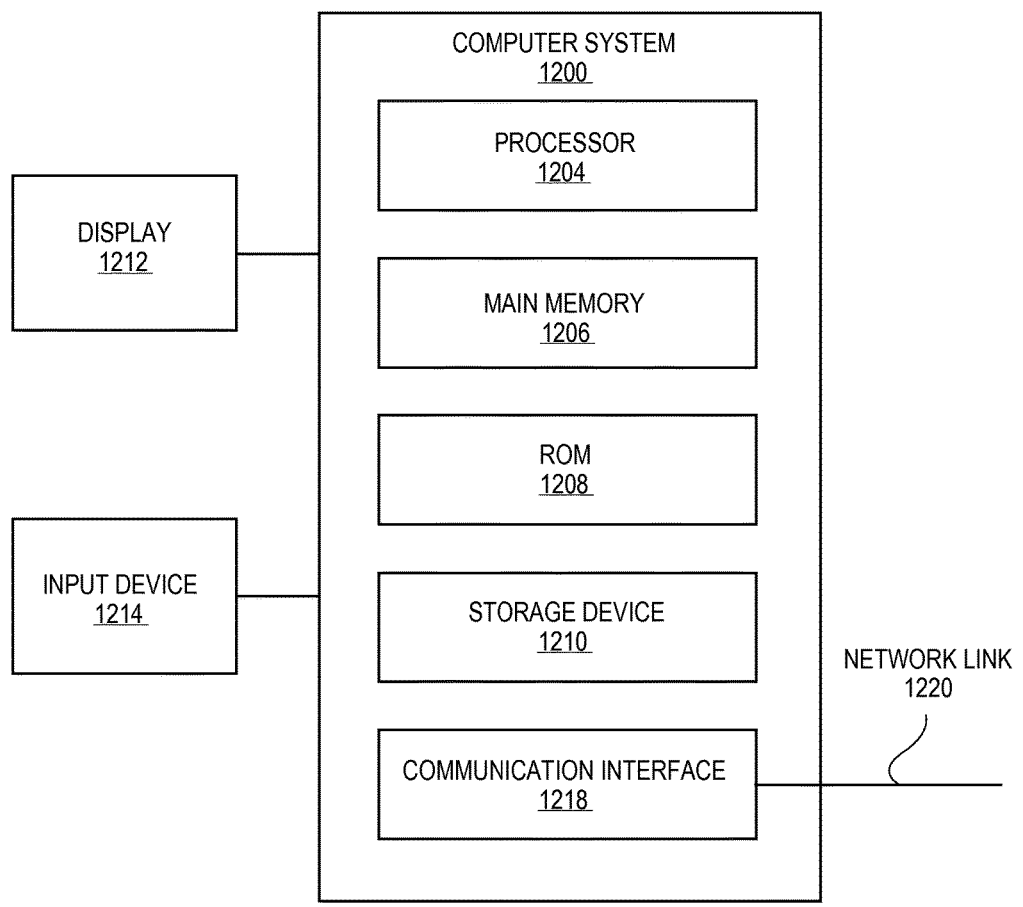
FIG. 12 is a block diagram that illustrates a computer system upon which an embodiment of the invention may be implemented.

In an embodiment, client 200 of FIG. 2 may be implemented on, include, or correspond to a computer system. FIG. 12 is a block diagram that illustrates a computer system 1200 upon which an embodiment of the invention may be implemented. In an embodiment, computer system 1200 includes processor 1204, main memory 1206, ROM 1208, storage device 1210, and communication interface 1218. Computer system 1200 includes at least one processor 1204 for processing information. Computer system 1200 also includes a main memory 1206, such as a random access memory (RAM) or other dynamic storage device, for storing information and instructions to be executed by processor 1204. Main memory 1206 also may be used for storing temporary variables or other intermediate information during execution of instructions to be executed by processor 1204. Computer system 1200 further includes a read only memory (ROM) 1208 or other static storage device for storing static information and instructions for processor 1204. A storage device 1210, such as a magnetic disk or optical disk, is provided for storing information and instructions.

Computer system 1200 may be coupled to a display 1212, such as a cathode ray tube (CRT), a LCD monitor, a television set, and the like, for displaying information to a user. In an embodiment, display 1212 may include a virtual display that is being rendered on a physical display. The virtual display may be rendered using a variety of protocols, such as a remote desktop protocol (RDP). An input device 1214, including alphanumeric and other keys, is coupled to computer system 1200 for communicating information and command selections to processor 1204. Other non-limiting, illustrative examples of input device 1214 include a mouse, a trackball, or cursor direction keys for communicating direction information and command selections to processor 1204 and for controlling cursor movement on display 1212. While only one input device 1214 is depicted in FIG. 12, embodiments of the invention may include any number of input devices 1214 coupled to computer system 1200.

Embodiments of the invention are related to the use of computer system 1200 for implementing the techniques described herein. According to one embodiment of the invention, those techniques are performed by computer system 1200 in response to processor 1204 executing one or more sequences of one or more instructions contained in main memory 1206. Such instructions may be read into main memory 1206 from another machine-readable medium, such as storage device 1210. Execution of the sequences of instructions contained in main memory 1206 causes processor 1204 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any tangible medium that participates in storing instructions which may be provided to processor 1204 for execution. Such a medium may take many forms, including but not limited to, non-volatile media and volatile media. Non-volatile media includes, for example, optical or magnetic disks, such as storage device 1210. Volatile media includes dynamic memory, such as main memory 1206.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 1204 for execution. For example, the instructions may initially be carried on a magnetic disk of a remote computer. The remote computer can load the instructions into its dynamic memory and send the instructions over a network link 1220 to computer system 1200.

Communication interface 1218 provides a two-way data communication coupling to a network link 1220 that is connected to a local network. For example, communication interface 1218 may be an integrated services digital network (ISDN) card or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through a local network to a host computer or to data equipment operated by an Internet Service Provider (ISP).

Computer system 1200 can send messages and receive data, including program code, through the network(s), network link 1220 and communication interface 1218. For example, a server might transmit a requested code for an application program through the Internet, a local ISP, a local network, subsequently to communication interface 1218. The received code may be executed by processor 1204 as it is received, and/or stored in storage device 1210, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory computer-readable storage mediums storing one or more sequences of instructions for partitioning network resources among virtual machines, which when executed by one or more processors, cause:
   upon a device receiving, from a first virtual machine executing on the device, a first request for network resources located over said one or more networks from said storage mediums, consulting policy data to determine how to service the first request;
   the device processing the first request by providing the first virtual machine with access to a first portion of the network resources, wherein the first virtual machine cannot access any of the network resources other than the first portion;
   upon the device receiving, from a second virtual machine executing on the device, a second request for network resources located over said one or more networks from said storage mediums, consulting the policy data to determine how to service the second request; and
   the device processing the second request by providing the second virtual machine with access to a second portion of the network resources, wherein the second virtual machine cannot access any of the network resources other than the second portion, and
   wherein the first portion is not coextensive with the second portion, and
   wherein the policy data is implemented by a module that decides which activities can be executed within said first virtual machine and said second virtual machine, including one or more of access control, determination of available resources, resource servicing, and creation or elimination of said first virtual machine or said second virtual machine.

2. The one or more non-transitory computer-readable storage mediums of claim 1, wherein execution of the one or more sequences of instructions further causes:
   in response to receiving a request from the first virtual machine to access resources of the second virtual machine, accessing the policy data; and
   determining, based on the policy data, whether to allow the first virtual machine to access the resources of the second virtual machine.

3. The one or more non-transitory computer-readable storage mediums of claim 1, wherein processing the first request further comprises:
   determining, based on the policy data, whether to allow the first virtual machine to access the second portion of network resources,
   and wherein processing the second request further comprises:
   determining, based on the policy data, whether to allow the second virtual machine to access the first portion of network resources.

4. The one or more non-transitory computer-readable storage mediums of claim 1, wherein execution of the one or more sequences of instructions further causes:
   receiving, from the first virtual machine, a third request for network resources, consulting policy data to determine how to service the third request; and
   processing, by a party other than the first virtual machine or said second virtual machine, the third request by, accessing a third portion of network resources, wherein neither the first nor the second virtual machine is allowed to access the third portion of network resources.

5. The one or more non-transitory computer-readable storage mediums of claim 1, wherein the first virtual machine is instantiated in response to the request for access to the first portion of network resources.

6. The one or more non-transitory computer-readable storage mediums of claim 1, wherein access to the first and second portion of network resources is accomplished by granting the first virtual machine access to a first virtual network interface and granting the second virtual machine access to a second virtual network interface, and wherein the first and second virtual network interfaces are implemented using the same physical network card.

7. The one or more non-transitory computer-readable storage mediums of claim 1, wherein the policy data is stored on the client machine.

8. The one or more non-transitory computer-readable storage mediums of claim 1, wherein the policy data defines a policy that considers information related to communication protocols, MIME types or port information associated with the request in determining how to service the request.

9. The one or more non-transitory computer-readable storage mediums of claim 1, wherein the policy data comprises whether a request for network resources resulted from input of an IP address.

10. The one or more non-transitory computer-readable storage mediums of claim 1, wherein the policy data comprises ensuring whether a request for network resources resulted from resolving a network address via a DNS query for a fully qualified domain name.

11. One or more non-transitory computer-readable storage mediums storing one or more sequences of instructions for partitioning network resources available to a virtualized environment, which when executed by one or more processors, cause:
   in response to receiving a first request from a first virtual machine for access to a first network resource on said one or more networks, accessing policy data to identify a network section to which the first request for access is directed; and
   based on the identifying, determining whether the first virtual machine may access the first network resource,
   wherein the policy data is implemented by a module that decides which activities can be executed within said first virtual machine, including one or more of access control, determination of available resources, resource servicing, and creation or elimination of said first virtual machine.

12. The one or more non-transitory computer-readable storage mediums of claim 11, wherein the first network resource is a web site.

13. The one or more non-transitory computer-readable storage mediums of claim 11, wherein the network section corresponds to an intranet.

14. The one or more non-transitory computer-readable storage mediums of claim 11, wherein the network section comprises a plurality of IP addresses.

15. The one or more non-transitory computer-readable storage mediums of claim 11, wherein the network section comprises a plurality of web sites.

16. The one or more non-transitory computer-readable storage mediums of claim 11, wherein execution of the one or more sequences of instructions further causes:
   in response to receiving a second request from the first virtual machine for access to a second network resource on said one or more networks, accessing policy data to identify a network section to which the second request for access is directed; and
   based on the determination that the network section to which the second request is directed comprises a trusted network section, denying the second request, wherein the first request was directed to an untrusted network section.

17. The one or more non-transitory computer-readable storage mediums of claim 16, wherein the trusted network section comprises an intranet.

18. The one or more non-transitory computer-readable storage mediums of claim 16, wherein the untrusted network section corresponds to an Internet.

19. The one or more non-transitory computer-readable storage mediums of claim 11, wherein execution of the one or more sequences of instructions further causes:
   in response to receiving a second request from a second virtual machine for access to a second network resource on the network, accessing policy data to identify a network section to which the second request for access is directed; and
   based on the identification, determining whether the second virtual machine may access the second network resource.

20. The one or more non-transitory computer-readable storage mediums of claim 19, wherein the second request from the second virtual machine is directed to a different network section than to which the first request from the first virtual machine is directed, and wherein execution of the one or more sequences of instructions further causes allowing the second virtual machine to access the second network resource.

21. The one or more non-transitory computer-readable storage mediums of claim 19, wherein execution of the one or more sequences of instructions further causes:
   in response to receiving a request from the first virtual machine to access resources of the second virtual machine, accessing the policy data to determine whether the first virtual machine may access the resources of the second virtual machine.

22. The one or more non-transitory computer-readable storage mediums of claim 21, wherein the request from the first virtual machine corresponds to a web page being rendered in the first virtual machine attempting to communicate with a web page being rendered within the second virtual machine.

23. The one or more non-transitory computer-readable storage mediums of claim 21, wherein execution of the one or more sequences of instructions further cause:
   determining whether the first virtual machine may access the second virtual machine based on which network port the first virtual machine contacts the second virtual machine.

24. The one or more non-transitory computer-readable storage mediums of claim 21, wherein execution of the one or more sequences of instructions further cause:
   determining whether the first virtual machine may access the second virtual machine based on either the MIME type of data requested from the second virtual machine by the first virtual machine or the network protocol utilized by the request to the second virtual machine by the first virtual machine.

25. The one or more non-transitory computer-readable storage mediums of claim 24, wherein the list of network protocols comprises at least one of the following: FTP, SMTP, HTTP, HTTPS and SSH.

26. A client, comprising:
   one or more processors;
   one or more storage mediums storing one or more sequences of instructions for partitioning network resources among virtual machines, which when executed by the one or more processors, causes:
      upon a device receiving, from a first virtual machine executing on the device, a first request for network resources, consulting policy data to determine how to service the first request;
      the device processing the first request by providing the first virtual machine with access to a first portion of the network resources, wherein the first virtual machine cannot access any of the network resources other than the first portion;
      upon the device receiving, from a second virtual machine, a second request for network resources, consulting the policy data to determine how to service the second request; and
      the device processing the second request by providing the second virtual machine with access to a second portion of the network resources, wherein the second virtual machine cannot access any of the network resources other than the second portion, and
   wherein the first portion is not coextensive with the second portion, and
   wherein the policy data is implemented by a module that decides which activities can be executed within said first virtual machine and said second virtual machine, including one or more of access control, determination of available resources, resource servicing, and creation or elimination of said first virtual machine or said second virtual machine.

27. A client, comprising:
   one or more processors;
   one or more storage mediums storing one or more sequences of instructions for partitioning network resources available to a virtualized environment, which when executed by the one or more processors, causes:
      in response to receiving a first request from a first virtual machine for access to a first network resource on said one or more networks, accessing policy data to identify a network section to which the first request for access is directed; and
      based on the identification, determining whether the first virtual machine may access the first network resource, and
   wherein the policy data is implemented by a module that decides which activities can be executed within said first virtual machine, including one or more of access control, determination of available resources, resource servicing, and creation or elimination of said first virtual machine.

28. A method for partitioning network resources among virtual machines, comprising:
   upon a device receiving, from a first virtual machine executing on the device, a first request for network resources, consulting policy data to determine how to service the first request;
   the device processing the first request by providing the first virtual machine with access to a first portion of the network resources, wherein the first virtual machine cannot access any of the network resources other than the first portion;
   upon the device receiving, from a second virtual machine, a second request for network resources, consulting the policy data to determine how to service the second request; and
   the device processing the second request by providing the second virtual machine with access to a second portion of the network resources, wherein the second virtual machine cannot access any of the network resources other than the second portion, and
   wherein the first portion is not coextensive with the second portion, and
   wherein the policy data is implemented by a module that decides which activities can be executed within said first virtual machine and said second virtual machine, including one or more of access control, determination of available resources, resource servicing, and creation or elimination of said first virtual machine or said second virtual machine.

29. A method for partitioning network resources available to a virtualized environment, comprising:
   in response to receiving a first request from a first virtual machine for access to a first network resource on a network, accessing policy data to identify a network section to which the first request for access is directed; and
   based on the identification, determining whether the first virtual machine may access the first network resource,
   wherein the policy data is implemented by a module that decides which activities can be executed within said first virtual machine, including one or more of access control, determination of available resources, resource servicing, and creation or elimination of said first virtual machine.

30. One or more non-transitory computer-readable storage mediums storing one or more sequences of instructions for partitioning network resources available to a virtualized environment, which when executed by one or more processors, cause:
   in response to receiving a request from a virtual machine for access to a network resource on a network, wherein the request comprises an IP address, causing a domain name server (DNS) query on the IP address to be performed;
   in response to the DNS query being resolved by a trusted DNS server, consulting policy data to determine how to service the request, wherein said trusted DNS server is a DNS server that is deemed trustworthy by policy data; and
   in response to the determination, granting or denying the request,
   wherein the policy data is implemented by a module that decides which activities can be executed within said virtual machine, including one or more of access control, determination of available resources, resource servicing, and creation or elimination of said virtual machine.

31. One or more non-transitory computer-readable storage mediums storing one or more sequences of instructions for partitioning network resources available to a virtualized environment, which when executed by one or more processors, cause:
   in response to receiving a request from a virtual machine for access to a network resource, determining whether the source of the request executing in the virtual machine is trusted or untrusted;
   if the source of the request is untrusted, then accessing policy data defining access rules for a first section and second section of the network;
   identifying whether the requested network resource corresponds to the first section or second section; and
   in response to the identification, determining whether to allow the request based on the policy data,
   wherein the policy data is implemented by a module that decides which activities can be executed within said virtual machine, including one or more of access control, determination of available resources, resource servicing, and creation or elimination of said virtual machine.

32. The one or more non-transitory computer-readable storage mediums of claim 31, wherein the first section comprises an Intranet, and wherein the Intranet is determined by querying a trusted domain name server.

33. The one or more non-transitory computer-readable storage mediums of claim 31, wherein the second section comprises an arbitrarily defined set of network resources.

* * * * *